(12) United States Patent
Kitamura et al.

(10) Patent No.: US 7,895,468 B2
(45) Date of Patent: Feb. 22, 2011

(54) AUTONOMOUS TAKEOVER DESTINATION CHANGING METHOD IN A FAILOVER

(75) Inventors: Takeshi Kitamura, Yokohama (JP); Hirofumi Ikawa, Yokohama (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 460 days.

(21) Appl. No.: 12/017,448

(22) Filed: Jan. 22, 2008

(65) Prior Publication Data

US 2009/0024869 A1 Jan. 22, 2009

(30) Foreign Application Priority Data

Jul. 18, 2007 (JP) ............................. 2007-186983

(51) Int. Cl.
*G06F 11/00* (2006.01)
(52) U.S. Cl. ............................................. 714/10; 714/4
(58) Field of Classification Search ........................ None
See application file for complete search history.

(56) References Cited

U.S. PATENT DOCUMENTS 7,191,357 B2 * 3/2007 Holland et al. ................ 714/5

2005/0234919 A1 * 10/2005 Maya et al. .................... 707/10
2008/0288812 A1 * 11/2008 Maya et al. .................... 714/4

FOREIGN PATENT DOCUMENTS

JP 2006-323526 11/2006

* cited by examiner

*Primary Examiner*—Michael C Maskulinski
(74) *Attorney, Agent, or Firm*—Antonelli, Terry, Stout & Kraus, LLP.

(57) ABSTRACT

For realizing an optimum failover in NAS, this invention provides a computer system including: a first computer; a second computer; a third computer; and a storage device coupled to the plurality of computers via a network, in which: the first computer executes, upon reception of an access request to the storage device from a client computer coupled to the plurality of computers, the requested access; and transmits to the client computer a response to the access request; the second computer judges whether a failure has occurred in the first computer; obtains load information of the second computer; obtains load information of the third computer from the third computer; and transmits a change request to the third computer when the obtained load information satisfies a predetermined condition; and the third computer judges whether a failure has occurred in the first computer when the change request is received from the second computer.

18 Claims, 28 Drawing Sheets

FIG. 20

CONTROL INFORMATION (NAS-01) 215

| OWN NODE ID (LOAD) 2001 | SERVICE 2002 | CLIENT 2003 | OWN NODE RANK 2004 | FP1 2005 | FP2 2006 | FP3 (LOAD) 2007 | PRIORITY NUMBER 2008 | TAKEOVER INFORMATION 2009 |
|---|---|---|---|---|---|---|---|---|
| NAS-01 (10) | A | 1 | FP2 | NAS-00 | — | NAS-02 (20) NAS-03 (90) | — | IP ADDRESS : 192.168.10.1 FSID : FS1 USER INFORMATION: GENERAL AFFAIRS DEPARTMENT |
| | B | 2 | FP1 | — | NAS-02 | NAS-00 NAS-03 | — | IP ADDRESS : 192.168.10.2 FSID : FS2 USER INFORMATION: ACCOUNTING DEPARTMENT |

FIG. 21

CONTROL INFORMATION (NAS-02)

| OWN NODE ID (LOAD) | SERVICE | CLIENT | OWN NODE RANK | FP1 | FP2 | FP3 (LOAD) | PRIORITY NUMBER | TAKEOVER INFORMATION |
|---|---|---|---|---|---|---|---|---|
| NAS-02 (20) | A | 1 | FP3 | NAS-00 | NAS-01 | NAS-03 | NAS-20 | IP ADDRESS : 192.168.10.1<br>FSID : FS1<br>USER INFORMATION: GENERAL AFFAIRS DEPARTMENT |
| | B | 2 | FP2 | NAS-01 | — | NAS-00 (40)<br>NAS-03 (90) | — | IP ADDRESS : 192.168.10.2<br>FSID : FS2<br>USER INFORMATION: ACCOUNTING DEPARTMENT |

2001　2002　2003　2004　2005　2006　2007　2008　2009

AUTONOMOUS TAKEOVER DESTINATION CHANGING METHOD IN A FAILOVER

CLAIM OF PRIORITY

The present application claims priority from Japanese application JP2007-186983 filed on Jul. 18, 2007, the content of which is hereby incorporated by reference into this application.

BACKGROUND

A technology disclosed herein relates to a management method for a storage subsystem, more particularly, to a failover management method in a so-called NAS system.

There is conventionally known network attached storage (NAS) in which a storage system connected to a network is used by a plurality of client computers connected to the network as a shared disk. The NAS is composed of servers including a network interface and a disk device for storing data. Each of the servers constituting the NAS is also called NAS server or NAS node (in the description hereinbelow, will simply be referred to as node).

In order that services may continuously be provided even when a failure occurs in hardware or software constituting the NAS, two nodes generally constitute a cluster. When a failure occurs in one of the nodes constituting the cluster, the other one of the nodes takes over the service provision of the node in which the failure has occurred. As a result, provision of the service can be continued and an effect of the failure in the node to clients can be suppressed to a minimum level. The technique as described above is called failover.

In addition, there is also known a technique in which three or more nodes constitute a cluster. In this case, a single management server collectively manages the nodes in the cluster. Thus, when a failure occurs in the management server, there is a problem that the cluster stops functioning. This problem is called single point failure. For avoiding the single point failure, JP 2006-323526 A discloses a technique of monitoring the management server by nodes other than the management server in the cluster, and causing another node to operate as the management server when a failure occurs in the management server.

SUMMARY

According to JP 2006-323526 A, when a failure occurs in the management server, a node that is to newly operate as the management server is selected based on a load of each of the nodes. Accordingly, a node optimum for balancing the load of the nodes can be selected as a new management server. In this case, however, it is necessary to execute selection of a new management server before a process is taken over by the new management server since the occurrence of the failure in the management server, and to acquire management information necessary for the node to operate as the management server. On the other hand, by determining in advance a node to serve as the new management server, the new management server can readily take over the process when a failure occurs in the current management server. However, because the load of the nodes changes temporally, there is a case where the management server selected in advance is not optimum for balancing the load of the nodes at a time point when the node starts to operate as the new management server.

According to a representative invention disclosed in this application, there is provided a computer system, comprising: a plurality of computers including a first computer, a second computer, and a third computer; and a storage device coupled to the plurality of computers via a network, the first computer including a first interface coupled to the network, a first processor coupled to the first interface, and a first memory coupled to the first processor, the second computer including a second interface coupled to the network, a second processor coupled to the second interface, and a second memory coupled to the second processor, the third computer including a third interface coupled to the network, a third processor coupled to the third interface, and a third memory coupled to the third processor, wherein: the first computer is configured to: execute, upon reception of an access request to a storage area of the storage device from a client computer coupled to the plurality of computers, the requested access; and transmit to the client computer a response to the access request; the second computer is configured to: judge whether a failure has occurred in the first computer; obtain load information of the second computer; obtain load information of the third computer from the third computer; and transmit a change request to the third computer when the obtained load information satisfies a predetermined condition; and the third computer is configured to judge whether a failure has occurred in the first computer when the change request is received from the second computer.

According to the embodiment of this invention, a takeover node for taking over service provision when a failure occurs in the node providing the service is determined in advance. Thus, a ready takeover at the time of occurrence of the failure can be realized. Further, in a case where the load of the nodes fluctuates prior to the occurrence of the failure, the takeover node is changed so that an optimum node is set as the takeover node. Therefore, a stable operation due to load balance can be realized. The processing as described above is executed automatically by the nodes, whereby operation management costs can be reduced.

BRIEF DESCRIPTION OF THE DRAWINGS

FIG. 20 is an explanatory diagram showing an example of control information retained in the node according to the embodiment of this invention.

FIG. 21 is an explanatory diagram showing another example of the control information retained in the node according to the embodiment of this invention.

DETAILED DESCRIPTION OF THE PREFERRED EMBODIMENT

Hereinafter, an embodiment of this invention will be described with reference to the drawings.

Figure 1:
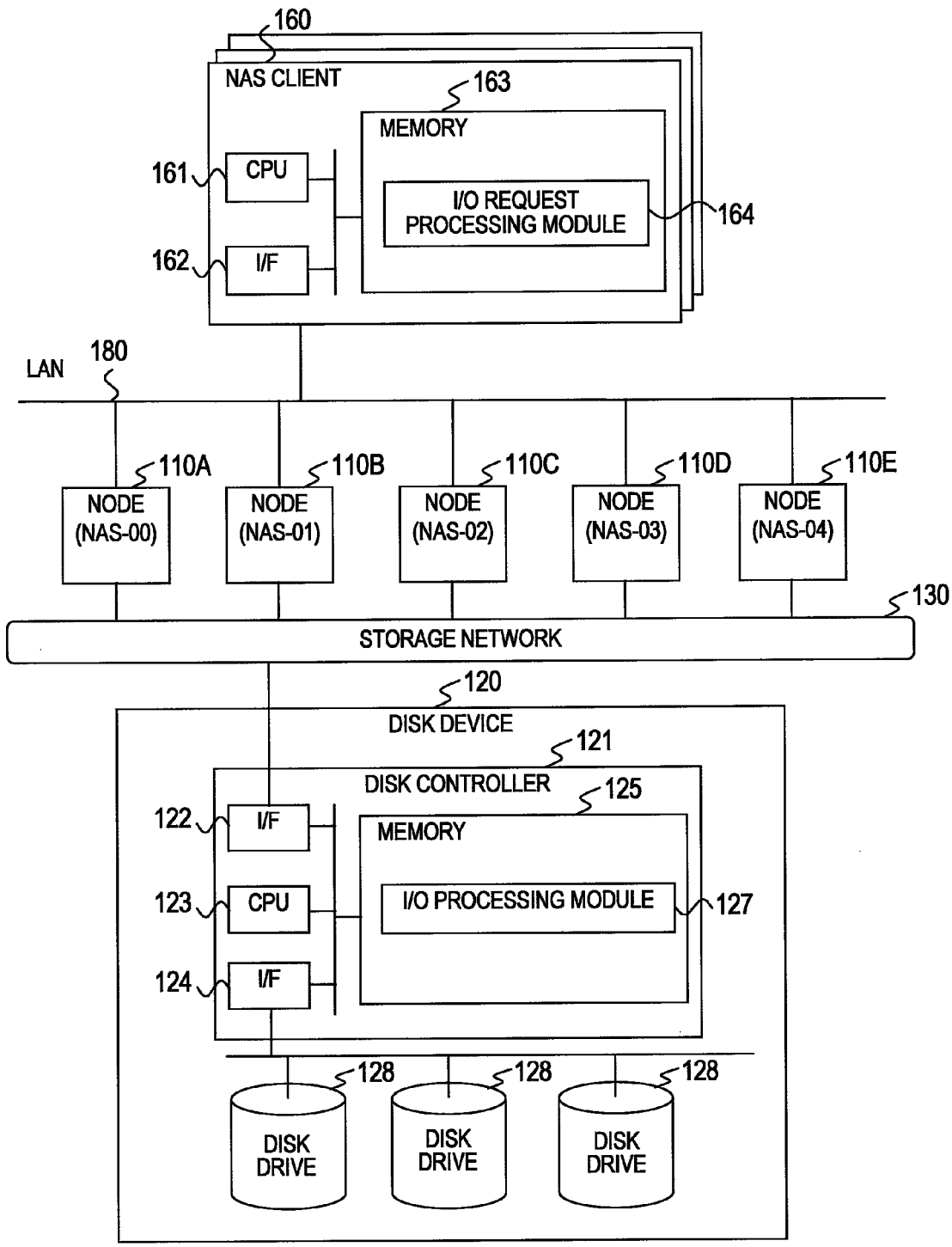
FIG. 1 is a block diagram showing a hardware structure of a computer system according to an embodiment of this invention.

FIG. 1 is a block diagram showing a hardware structure of a computer system according to the embodiment of this invention.

The computer system according to this embodiment includes one or more network attached storage (NAS) clients 160, nodes 110A to 110E, and a disk device 120.

The NAS clients 160 and the nodes 110A to 110E are connected to one another via a local area network (LAN) 180.

The nodes 110A to 110E and the disk device 120 are connected to one another via a storage network 130.

The nodes (so-called NAS server or NAS node) 110A to 110E are computers for connecting the disk device 120 to the LAN 180. A structure of the node 110A and the like will be described later in detail with reference to FIG. 2. "NAS-00" to "NAS-04" displayed on the nodes 110A to 110E in FIG. 1, respectively, are each an identifier of the respective nodes 110A to 110E.

The disk device 120 is a device for storing data written by the NAS client 160. The disk device 120 according to this embodiment includes a disk controller 121 and one or more disk drives 128.

Each of the disk drives 128 is a storage device that provides data storage areas. The disk drive 128 may be, for example, a hard disk drive (HDD), but may also be other types of storage devices (e.g., semiconductor storage device such as a flash memory). The disk device 120 may include a plurality of disk drives 128. The plurality of disk drives 128 may constitute redundant arrays of inexpensive disks (RAID). Data written by the NAS client 160 is eventually stored in the storage area provided by the disk drives 128.

The disk controller 121 is a control device for controlling the disk device 120. The disk controller 121 according to this embodiment includes an interface (I/F) 122, a CPU 123, an interface (I/F) 124, and a memory 125, which are connected to one another.

The I/F 122 is an interface for connecting the disk controller 121 to the storage network 130. The disk controller 121 communicates with the node 110A and the like connected to the storage network 130 via the I/F 122.

The CPU 123 is a processor for executing a program stored in the memory 125.

The I/F 124 is an interface for connecting the disk controller 121 to the disk drives 128. The disk controller 121 performs data write and data read to/from the disk drives 128 via the I/F 124.

The memory 125 is, for example, a semiconductor memory, and stores a program to be executed by the CPU 123 and data referenced by the CPU 123. The memory 125 according to this embodiment stores at least an I/O processing module 127. The I/O processing module 127 is a program module for controlling data write and data read to/from the disk drives 128.

The disk controller 121 may further include a cache memory (not shown) for temporarily storing data.

It should be noted that although FIG. 1 shows an example case where the disk device 120 includes the plurality of disk drives 128, the disk drive 120 may include only one disk drive 128. Alternatively, the disk device 120 may be a single disk drive 128 including an interface connectable to the storage network 130.

The storage network 130 is a network through which the nodes 110A to 110E and the disk device 120 communicate with one another. The storage network 130 may be an arbitrary type of network. For example, the storage network 130 may be a PCI bus or fibre channel (FC) network.

It should be noted that in the description below, other than a case where the nodes 110A to 110E need to be discriminated from one another, the nodes 110A to 110E will generically be referred to as nodes 110.

FIG. 1 shows the computer system including five nodes 110 and one disk device 120. However, this embodiment can be realized by a computer system including three or more nodes 110 and one or more disk devices 120.

The NAS client 160 is a computer for executing various applications. The NAS client 160 according to this embodiment includes a CPU 161, an interface (I/F) 162, and a memory 163.

The CPU 161 is a processor for executing a program stored in the memory 163.

The I/F 162 is an interface for connecting the NAS client 160 to the LAN 180. The NAS client 160 communicates with devices connected to the LAN 180 (e.g., nodes 110) via the I/F 162.

The memory 163 is, for example, a semiconductor memory, and stores a program to be executed by the CPU 161 and data referenced by the CPU 161. The memory 163 according to this embodiment stores at least an I/O request processing module 164.

The I/O request processing module 164 is provided as a part of an operating system (OS) (not shown) run on the NAS client 160. The OS of the NAS client 160 may be an arbitrary operating system (e.g., Windows or Solaris).

The memory 163 further stores various application programs (not shown) that are executed on the OS. A write request and a read request issued by the application program are processed by the I/O request processing module 164.

The computer system according to this embodiment may include an arbitrary number of NAS clients 160.

Figure 2:
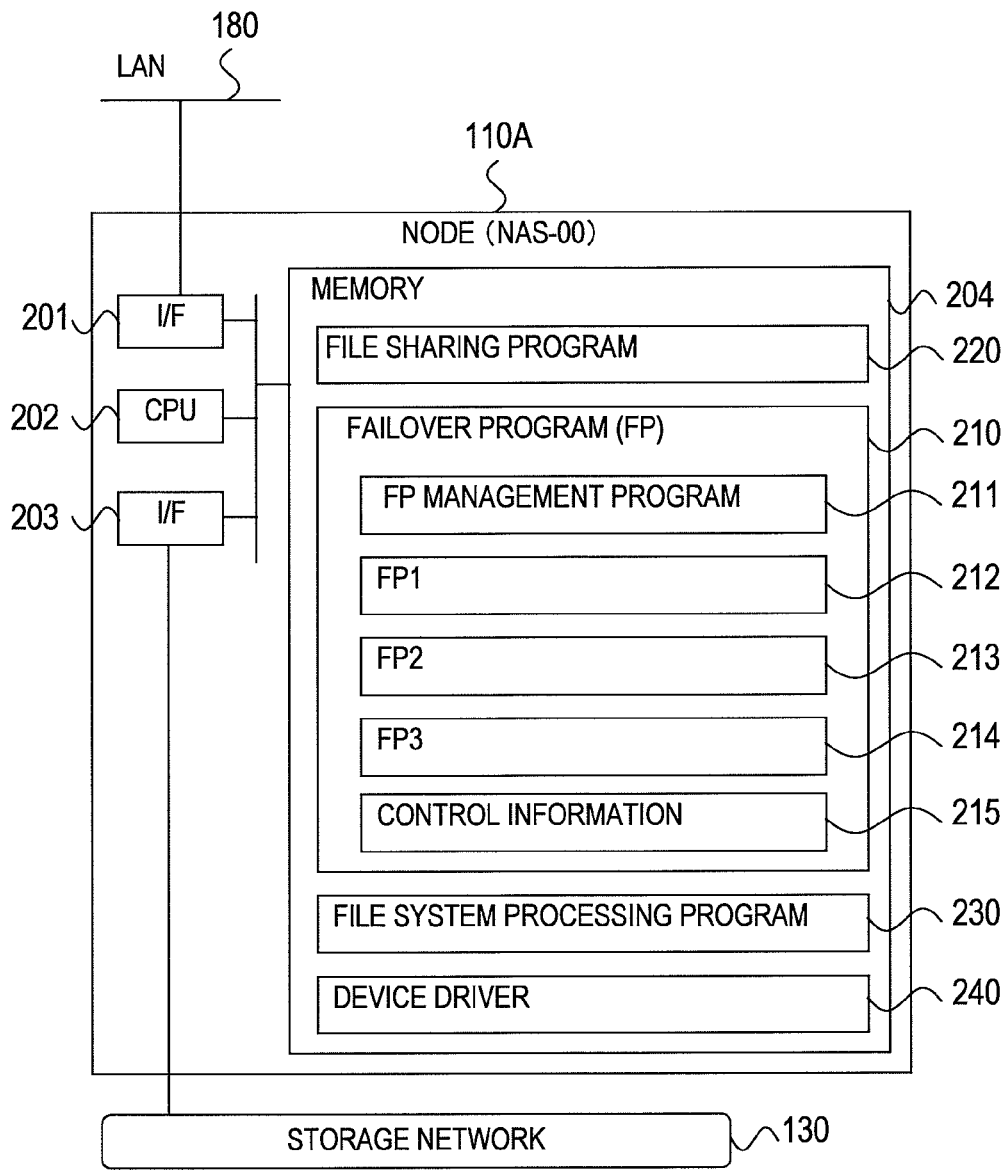
FIG. 2 is a block diagram showing a hardware structure of a node according to the embodiment of this invention.

FIG. 2 is a block diagram showing a hardware structure of the node 110 according to the embodiment of this invention.

As an example, FIG. 2 shows a hardware structure of the node 110A. Hardware structures of the nodes 110B to 110E are the same as that of the node 110A. Therefore, illustrations and descriptions thereof will be omitted.

The node 110 includes an interface (I/F) 201, a CPU 202, an interface (I/F) 203, and a memory 204, which are connected to one another.

The I/F 201 is an interface for connecting the node 110 to the LAN 180. The node 110 communicates with devices connected to the LAN 180 (e.g., NAS clients 160) via the I/F 201. The I/F 201 is, for example, a so-called network interface card (NIC).

The CPU 202 is a processor for executing a program stored in the memory 204. Therefore, in the description below, processing executed by the program stored in the memory 204 (e.g., failover program 210 and FP management program 211 of each rank, both of which are to be described later) is actually executed by the CPU 202.

The I/F 203 is an interface for connecting the node 110 to the storage network 130. The node 110 communicates with the disk device 120 via the I/F 203. The I/F 203 is, for example, a so-called host bus adapter (HBA).

The memory 204 is, for example, a semiconductor memory, and stores a program to be executed by the CPU 202 and data referenced by the CPU 202. The memory 204 according to this embodiment stores, as program modules to be executed by the CPU 202, at least a failover program (FP) 210, a file sharing program 220, a file system processing program 230, and a device driver 240. The file system processing program 230 and the device driver 240 are provided as a part of the OS (not shown) run on the node 110.

The failover program 210 is a program module that is executed by the CPU 202 for managing a failover of the nodes 110. An FP1 (212), an FP2 (213), and an FP3 (214) are ranks (statuses) that the operating failover program 210 may take. The ranks of the failover program 210 are realized by generating a process corresponding to the respective ranks. The FP management program 211 is a program module for managing generation and deletion of those processes. Further, the failover program 210 manages control information 215.

In the description below, a state where the failover program 210 of the rank FP1 (212) is operated will merely be described as FP1 (212) is operated. The same applies for the operation of the failover program 210 of the rank FP2 (213) and the failover program 210 of the rank FP3 (214).

A plurality of failover programs 210 may be operated in a single node 110, reference of which should be made to FIG. 17 and the like to be described later. In this case, ranks of those plurality of failover programs 210 may be different from one another.

Descriptions on a transition from one rank to another rank, processing executed by the FP management program 211, processing executed by the failover program 210 of each rank, and the control information 215 will be given later in detail.

The file sharing program 220 provides a function of sharing a file by the NAS clients 160 by providing a file sharing protocol to the NAS clients 160 connected to the LAN 180. The file sharing protocol may be, for example, a network file system (NFS) or a common internet file system (CIFS). Upon reception of an I/O (i.e., read or write) request from the NAS client 160 in file units, the file sharing program 220 executes I/O processing in file units that corresponds to the request on a file system to be described later.

The file system processing program 230 provides logical views (e.g. directory and file) of a hierarchical structure to higher-order layers and executes I/O processing on lower-order layers by converting those views into data having a physical data structure (block data, block address).

The device driver 240 executes block I/O processing requested by the file system processing program 230.

Figure 3:
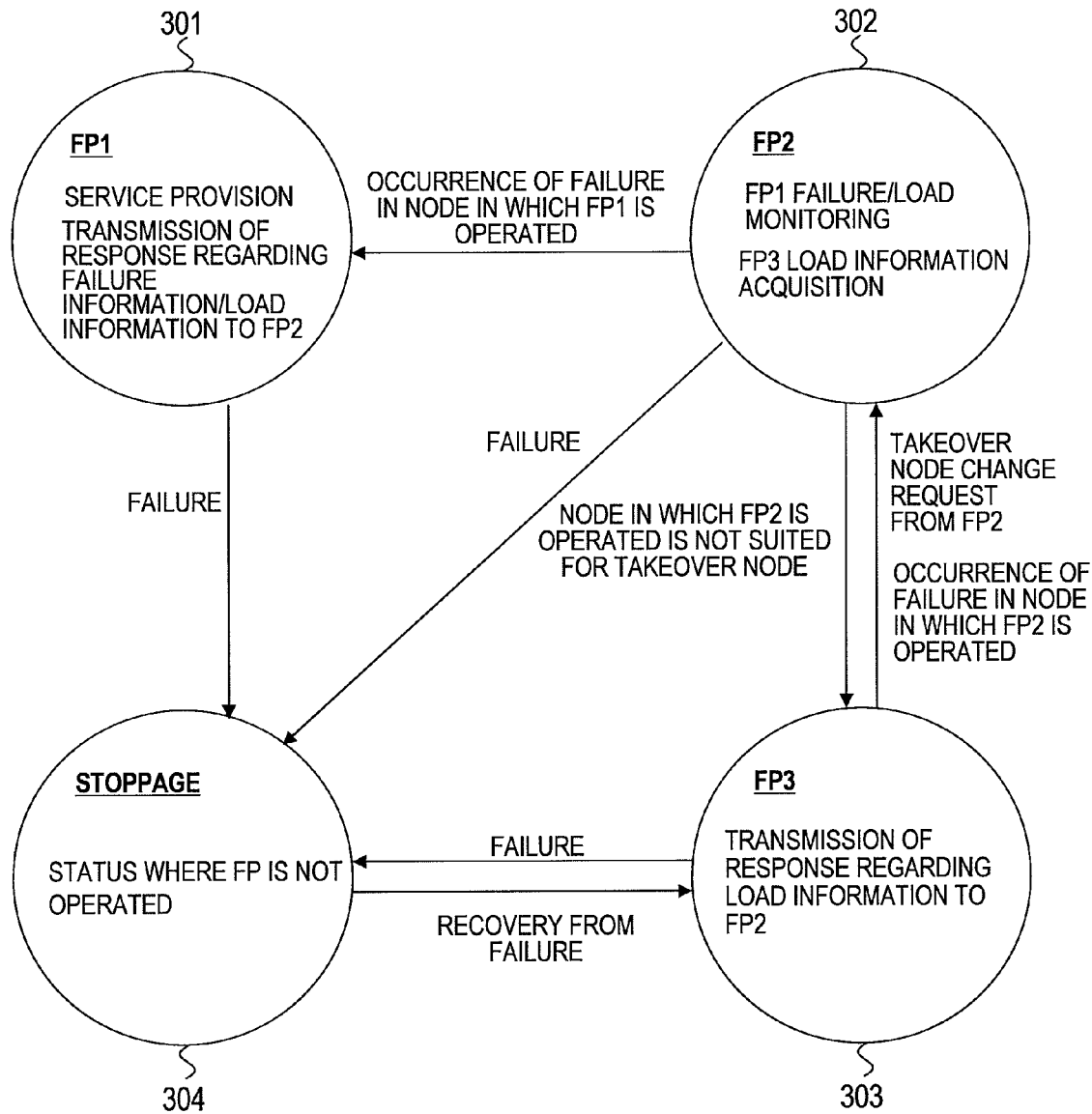
FIG. 3 is an explanatory diagram showing status transitions of a failover program according to the embodiment of this invention.

FIG. 3 is an explanatory diagram showing status transitions of the failover program 210 according to the embodiment of this invention.

Here, a description will be given of the failover.

At least one of the plurality of nodes 110 provides a file sharing service to the NAS client 160. When the node 110 providing the service becomes incapable of providing the service due to an occurrence of a failure, for example, provision of the service by the node 110 is taken over by another node 110 to be provided thereby. As a result, even when a failure occurs in any of the nodes 110, the NAS client 160 can keep accessing data in the disk device 120. The takeover of the service provision as described above is called failover. The failover program 210 is a program for realizing such failover. An example of the failover will be described later in more detail with reference to FIG. 10 and the like.

Next, status transitions of the failover program 210 will be described.

The failover program 210 may take any status including a status where the failover program 210 of one of the ranks FP1 (212) to FP3 (214) is operated (i.e., one of statuses 301 to 303) and a status where the failover program 210 is not operated (i.e., status 304).

The following description on FIG. 3 is made under the presumption that the FP1 (212) is operated in one node 110, the FP2 (213) is operated in another node 110, and the FP3 (214) is operated in at least one of the remaining nodes 110, in the computer system including three or more nodes 110 as shown in FIG. 1.

The node 110 in which the FP1 (212) is operated provides a service to the NAS client 160. Upon reception of a failure monitor request from the node 110 in which the FP2 (213) is operated, the FP1 (212) transmits a response to the request. When a failure occurs in the node 110 in which the FP1 (212) is operated, the operation of the failover program 210 of the node 110 is stopped. In other words, when a failure occurs in the node 110 in which the FP1 (212) is operated, the status of the failover program 210 operated in the node 110 transits from the status 301 to the status 304.

The node 110 in which the FP2 (213) is operated is a takeover node of the service provision of the node 110 in which the FP1 (212) is operated. Specifically, the node 110 in which the FP2 (213) is operated monitors the node 110 in which the FP1 (212) is operated, and when a failure occurs in the monitored node 110, takes over the service provision of the node 110 in which the failure has occurred. Then, the rank of the failover program 210 that is operated in the node 110 that has taken over the service provision transits from the FP2 (213) to the FP1 (212). In other words, when a failure occurs in the node 110 in which the FP1 (212) is operated, the status of the failover program 210 of the node 110 monitoring the node 110 in which the failure has occurred transits from the status 302 to the status 301. Hereinafter, the node 110 in which the FP2 (213) is operated will also be referred to as takeover node.

Further, the FP2 (213) acquires load information of the node 110 in which the FP3 (214) is operated. Specifically, the FP2 (213) transmits to the FP3 (214) a load information acquisition request at predetermined timings. When the load information satisfies a predetermined condition, the node 110 in which the FP3 (214) is currently operated is more suited for the takeover node than the node 110 in which the FP2 (213) is currently operated. Accordingly, when the load information satisfies the predetermined condition, the FP2 (213) transmits to the FP3 (214) a request for changing the takeover node (hereinafter, will be referred to as change request). The FP2 (213) that has transmitted the change request transits to the FP3 (214). In other words, the status of the failover program 210 that has transmitted the change request transits from the status 302 to the status 303.

When a failure occurs in the node 110 in which the FP2 (213) is operated, the operation of the failover program 210 of the node 110 is stopped. In other words, when a failure occurs in the node 110 in which the FP2 (213) is operated, the status of the failover program 210 operated in the node 110 transits from the status 302 to the status 304.

Upon reception of the load information acquisition request from the FP2 (213), the FP3 (214) transmits to the FP2 (213) load information of the node 110 in which the FP3 (214) is operated.

Upon reception of the change request from the FP2 (213), the FP3 (214) transits to the FP2 (213). In other words, the status of the failover program 210 that has received the change request transits from the status 303 to the status 302.

When the load information acquisition request is not received at the predetermined timings, the FP3 (214) judges that a failure has occurred in the node 110 in which the FP2 (213) is operated. In this case, the FP3 (214) transits to the FP2 (213). In other words, the status of the failover program 210 of the node 110 that has detected the failure of the node 110 in which the FP2 (213) is operated transits from the status 303 to the status 302. It should be noted that as will be described later, when the FP3 (214) is operated in a plurality of nodes 110, the FP3 (214) of one of the nodes 110 transits to the FP2 (213).

When a failure occurs in the node 110 in which the FP3 (214) is operated, the operation of the failover program 210 of the node 110 is stopped. In other words, when a failure occurs in the node 110 in which the FP3 (214) is operated, the status of the failover program 210 operated in the node 110 transits from the status 303 to the status 304. Hereinafter, the node in which the FP3 (214) is operated will also be referred to as standby node.

When the node 110 recovers from a failure, the FP3 (214) is operated first in the node 110. Specifically, the status of the failover program 210 operated in the node 110 that has recovered from the failure transits from the status 304 to the status 303.

It should be noted that the status transitions as described above are executed through generation and deletion of processes. For example, the transition from the FP2 (213) to the FP3 (214) is executed by the FP management program 211 ending the process corresponding to the FP2 (213) and generating a process corresponding to the FP3 (214) thereafter.

Next, a description will be given of a specific example of the status transitions described with reference to FIG. 3.

Figure 4:
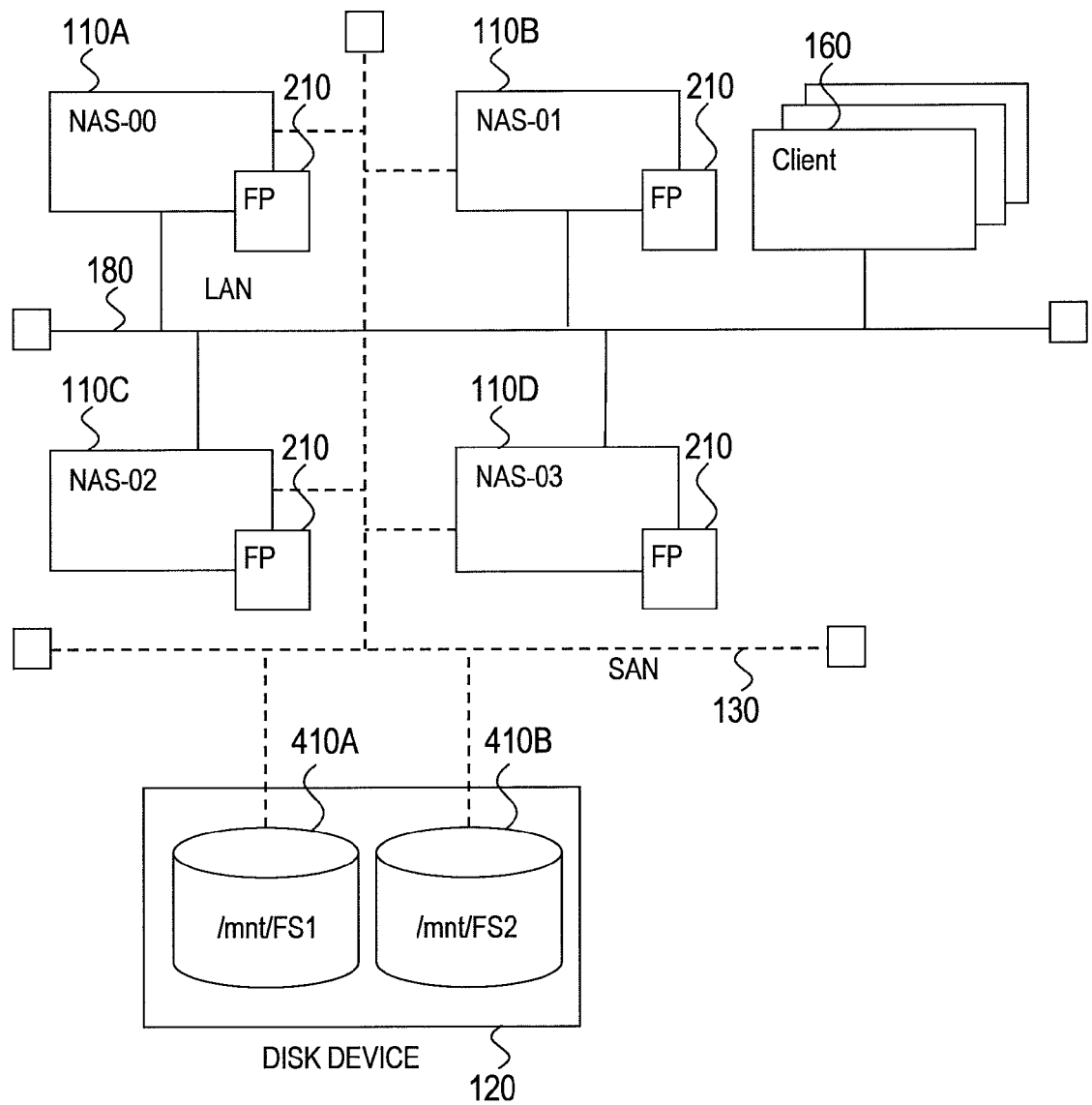
FIG. 4 is an explanatory diagram showing a structure of the computer system in which a processing of the embodiment of this invention is executed.

FIG. 4 is an explanatory diagram showing a structure of the computer system. Processing executed in the embodiment of this invention is executed under the precondition that the structure shown in FIG. 4 is provided.

The nodes 110A to 110D and the one or more NAS clients 160 are connected to one another via the LAN 180. The failover program 210 is operated in each of the nodes 110. The nodes 110A to 110D are further connected to the disk device 120 via a SAN 130. The nodes 110, the NAS clients 160, and the disk device 120 shown in FIG. 4 are similar to those shown in FIGS. 1 and 2. Therefore, in FIG. 4, detailed illustrations of the structures thereof will be omitted.

Pieces of data stored in the storage area of the disk device 120 are provided to the NAS client 160 by the file system processing program 230 as one or more file systems (file systems 410A and 410B in the example of FIG. 4). Identifiers of the file systems 410A and 410B are "FS1" and "FS2", respectively.

The description below is given mainly of processing executed by the node 110. Thus, unless necessary, illustrations of the disk device 120 and the SAN 130 are omitted in the figures described below.

Figure 5:
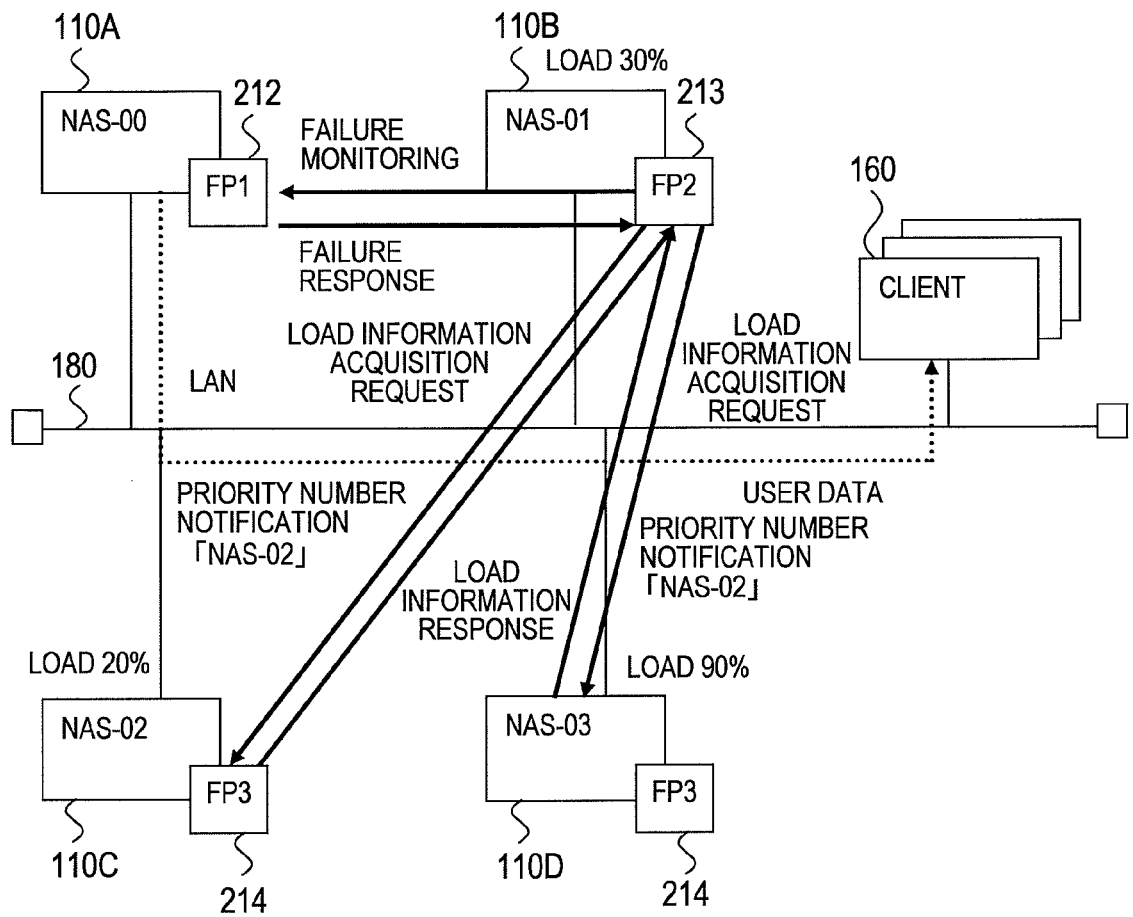
FIG. 5 is an explanatory diagram of processing executed when the computer system according to the embodiment of this invention is in a normal status.

FIG. 5 is an explanatory diagram of processing executed when the computer system according to the embodiment of this invention is in a normal status.

In the example of FIG. 5, the FP1 (212) is operated in the node 110A, the FP2 (213) is operated in the node 110B, and the FP3 (214) is operated in the nodes 110C and 110D.

In this case, the node 110A provides a service to the NAS client 160. Specifically, the node 110A processes a file access request from the NAS client 160 and transmits the processing result (e.g., read user data) to the NAS client 160 as a response.

The FP2 (213) that is operated in the node 110B monitors the node 110A. Specifically, the FP2 (213) transmits a failure monitor request to the FP1 (212) at predetermined timings (e.g. periodically). The FP1 (212) that has received the failure monitor request transmits a response to the request to the FP2 (213) as the request transmission source. The response in this case contains, for example, failure information and load information. The failure information is information indicating whether a failure has occurred in the node 110A in which the FP1 (212) is operated. The load information is information indicating a load of the node 110 (node 110A in this example). The load information may take any form as long as it is information that indicates the load of the node 110. For example, the load information may be a usage ratio of the CPU 202 of the node 110. Other examples of the load information will be described later.

Figure 10:
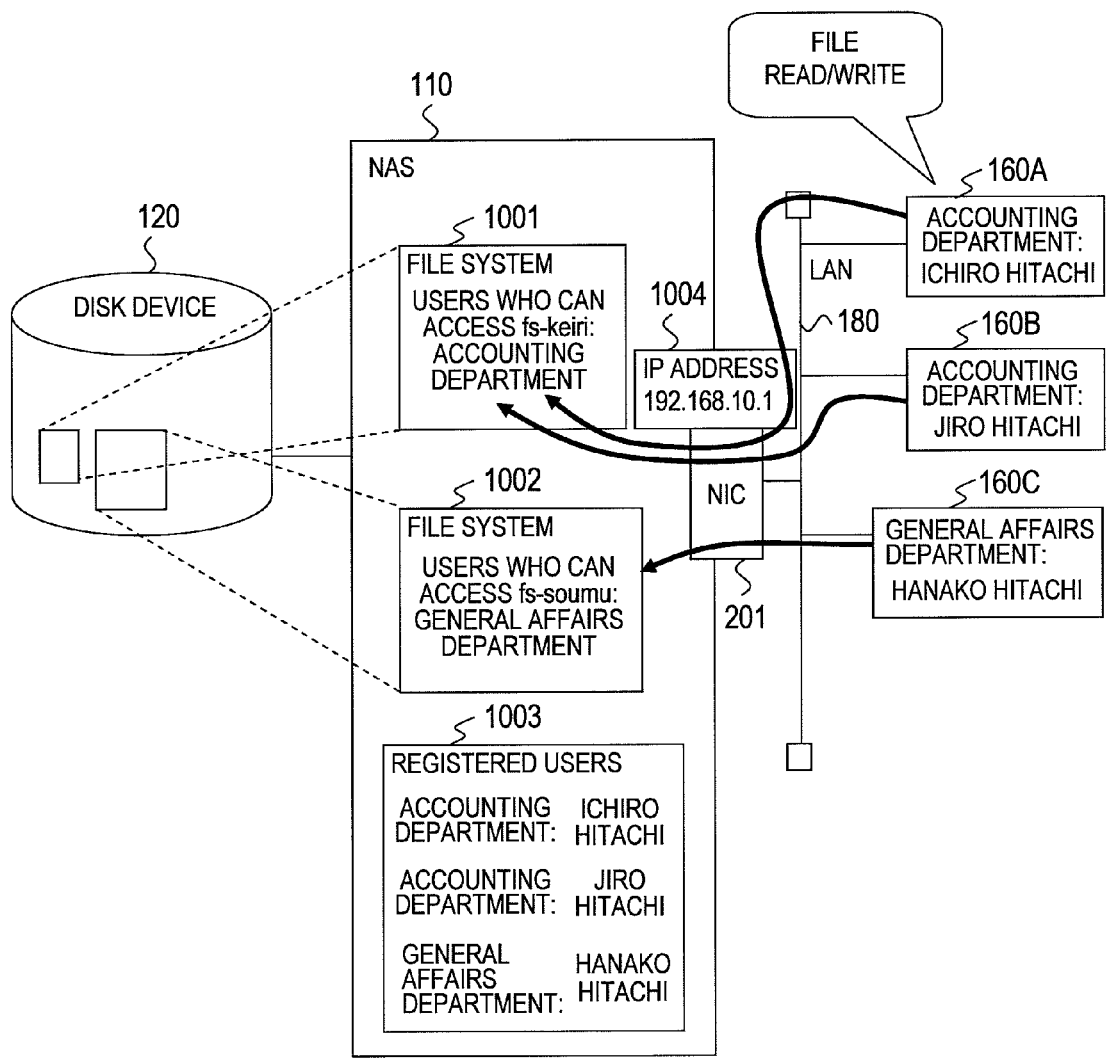
FIG. 10 is an explanatory diagram of a specific example of a file sharing service provided in the computer system according to the embodiment of this invention.

Further, when there is a change in information regarding the service provided by the node 110A (hereinafter, will be referred to as service information), service change information indicating the changed content is contained in the response. Here, the service information contains, for example, an identifier of a user who is to receive the service and an identifier of the file system provided by the service, details of which are shown in FIG. 10.

It should be noted that the FP1 (212) may spontaneously transmit information equivalent to the response as described above at predetermined timings (e.g., periodically), instead of transmitting a response to the failure monitor request.

In addition, the FP2 (213) acquires load information of the nodes 110C and 110D in which the FP3 (214) is operated. Specifically, the FP2 (213) transmits to the FP3 (214) operated in the nodes 110C and 110D a load information acquisition request at predetermined timings (e.g., periodically). The FP3 (214) that has received the load information acquisition request transmits a response to the request to the FP2 (213) as the request transmission source. The response from the FP3 (214) operated in the node 110C contains the load information of the node 110C. The response from the FP3 (214) operated in the node 110D contains the load information of the node 110D.

The FP2 (213) compares the pieces of load information of the nodes 110C and 110D acquired from the FP3 (214) and judges the node 110 having a smallest load. For example, as shown in FIG. 5, when the load of the node 110C is 10% and the load of the node 110D is 90%, the node 110C is judged to have the smallest load among the nodes 110 in which the FP3 (214) is operated. In this case, the FP2 (213) transmits to the FP3's (214) operated in the nodes 110C and 110D a next load information acquisition request into which a priority number "NAS-02" has been incorporated. The priority number "NAS-02" is an identifier of the node 110C. The priority number may be an identifier of the node 110 judged to have the smallest load, a number corresponding to the identifier, or the like.

Assuming that a failure has occurred in the node 110B, in order to avoid a single point failure, any of the FP3's (214) operated in the nodes 110C and 110D needs to transit to the FP2 (213). The node 110 in which the FP2 (213) is operated takes over the service provision when a failure occurs in the node 110 that is currently providing the service. Therefore, for balancing the loads of the nodes 110, it is desirable that the FP3 (214) of the node 110 having a smaller load transit to the FP2 (213). In other words, the priority number is an identifier of the node 110 that is most suited for a new takeover node when a failure occurs in the node 110 that is currently set as the takeover node. A specific usage of the priority number will be described later with reference to FIG. 13.

It should be noted that when the FP2 (213) acquires service change information from the FP1 (212), the FP2 (213) incorporates the acquired service change information into the load information acquisition request and transmits the request. The FP3 (214) that has received the load information acquisition request retains the service change information contained in the request.

Further, the FP2 (213) acquires the load information of the node 110B in which the FP2 (213) is operated.

When the acquired load information satisfies the predetermined condition, the FP2 (213) executes takeover node change processing. The takeover node change processing is processing of changing the node 110 that is to take over the service provision. An example of the predetermined condition is a condition where the load of the node 110 in which the FP2 (213) is operated is larger than the load of the node 110 in which the FP3 (214) is operated.

For example, when the pieces of load information (e.g., CPU usage ratios) of the nodes 110B, 110C, and 110D acquired by the FP2 (213) are 30%, 20%, and 90%, respectively, the load of the node 110B in which the FP2 (213) is operated is larger than the load of the node 110C in which the FP3 (214) is operated. Under such circumstances, when a failure occurs in the node 110A, for balancing the loads of the nodes 110, the node 110C is more desirable to take over the service provision than the node 110B. As described above, when it is judged that the node 110C is more suited for the takeover node than the node 110B which is currently set as the takeover node, for example, the takeover node change processing is executed even when a failure has not yet occurred in the node 110A that is providing the service.

Figure 6:
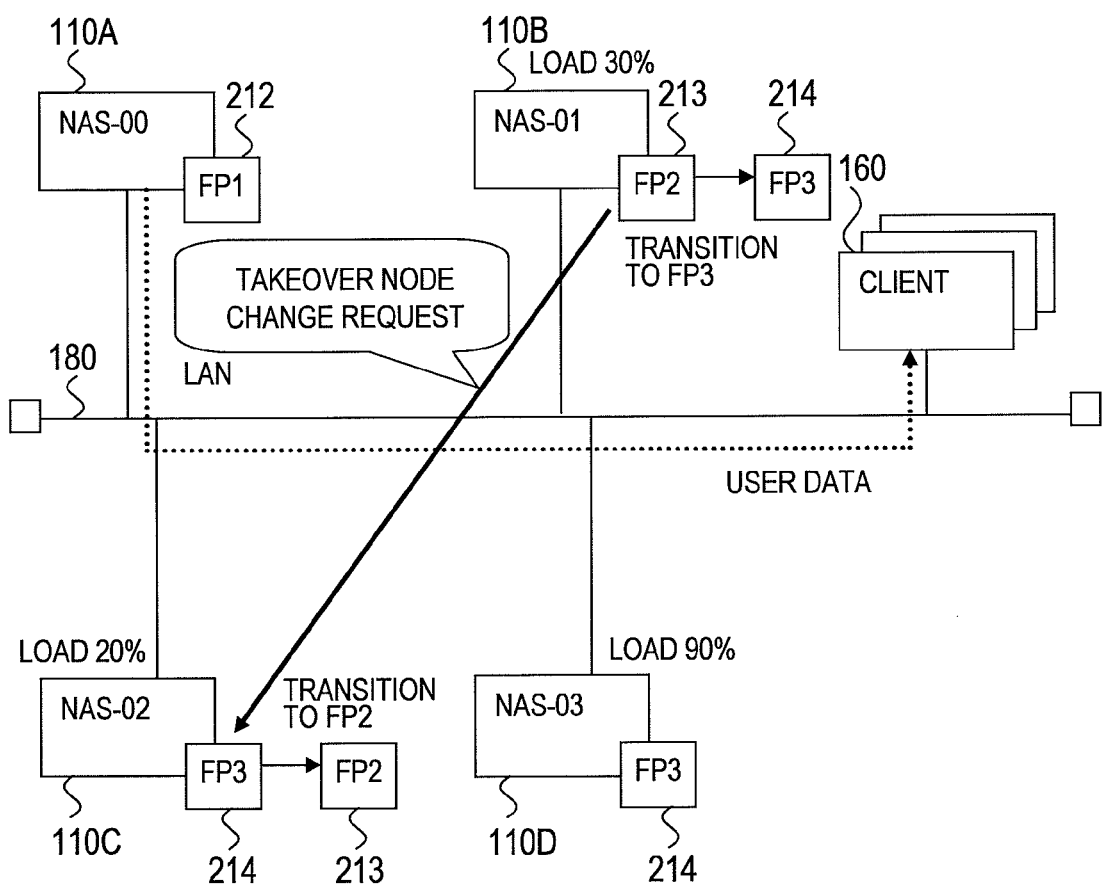
FIG. 6 is an explanatory diagram of a takeover node change processing executed in the computer system according to the embodiment of this invention.

FIG. 6 is an explanatory diagram of the takeover node change processing executed in the computer system according to the embodiment of this invention.

Specifically, as described above with reference to FIG. 5, FIG. 6 shows the processing executed when the node 110C is judged to be more suited for the takeover node than the node 110B.

In this case, the FP2 (213) that is operated in the node 110B transmits a takeover node change request to the FP3 (214) that is operated in the node 110C. After that, the FP2 (213) operated in the node 110B transits to the FP3 (214). On the other hand, the FP3 (214) operated in the node 110C that has received the takeover node change request transits to the FP2 (213).

Figure 7:
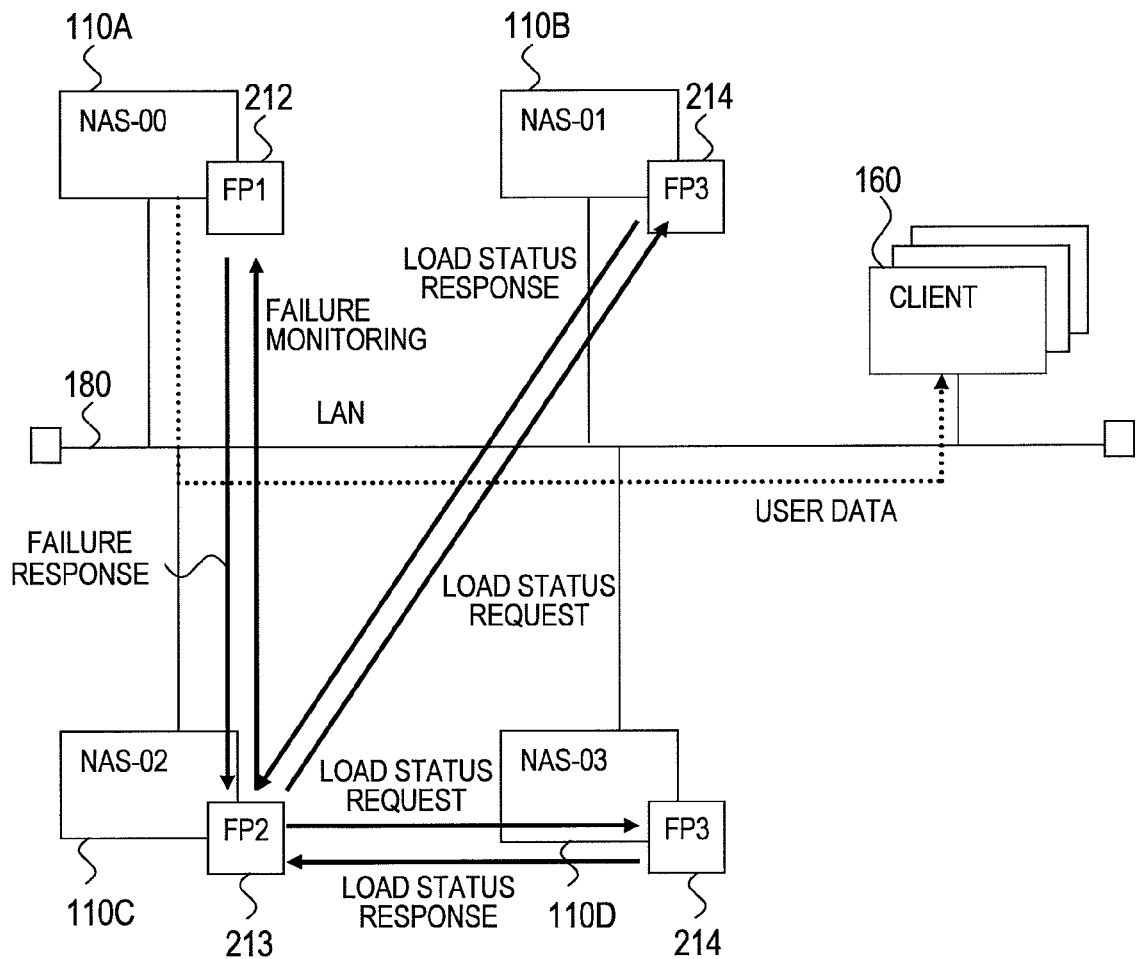
FIG. 7 is an explanatory diagram of the computer system after execution of the takeover node change processing according to the embodiment of this invention.

FIG. 7 is an explanatory diagram of the computer system after execution of the takeover node change processing according to the embodiment of this invention.

As a result of executing the takeover node change processing shown in FIG. 6, the FP1 (212) is successively operated in the node 110A, the FP3 (214) is newly operated in the node 110B, the FP2 (213) is newly operated in the node 110C, and the FP3 (214) is successively operated in the node 110D. Specifically, the FP2 (213) operated in the node 110C monitors the node 110A. In addition, the FP2 (213) operated in the node 110C acquires the load information of the nodes 110B and 110D. When a failure occurs in the node 110A, the node 110C takes over the service provision from the node 110A.

Figure 8:
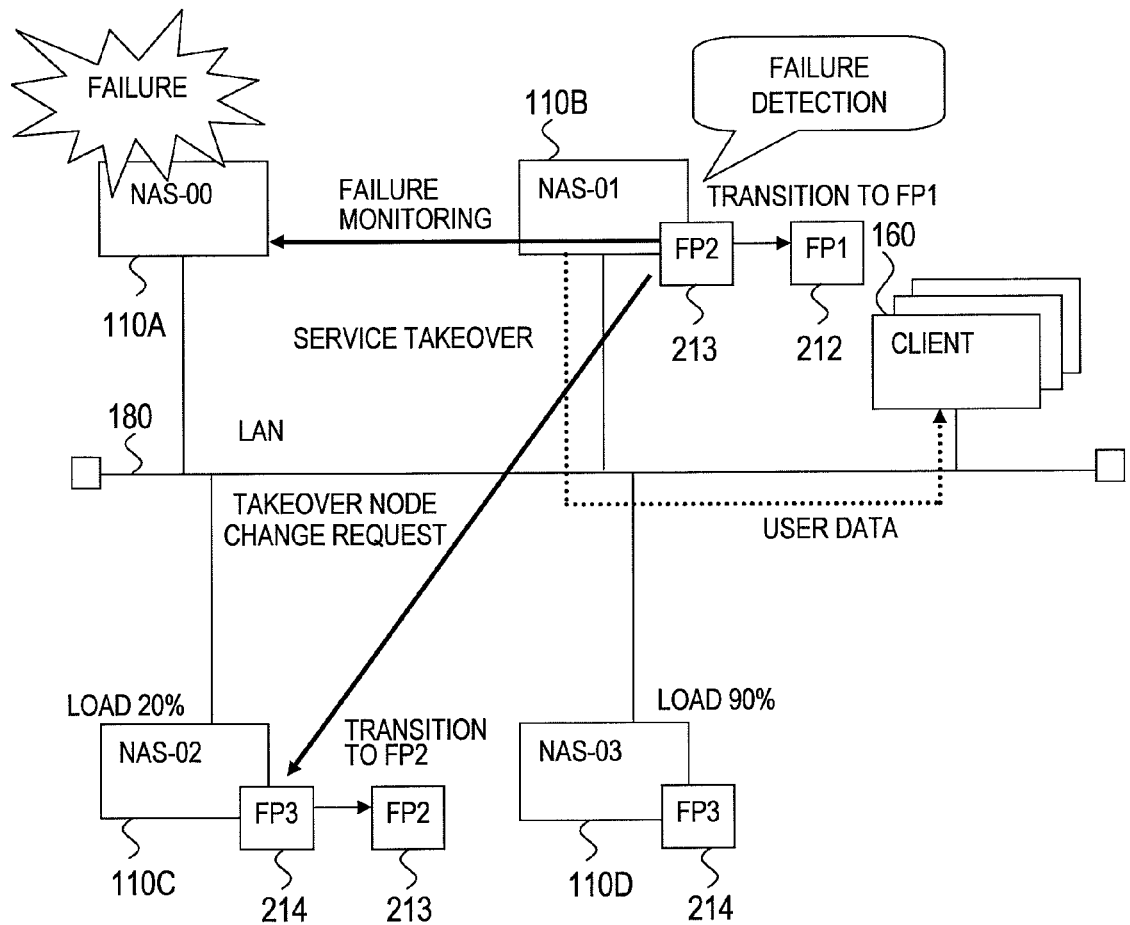
FIG. 8 is an explanatory diagram of service takeover processing executed in the computer system according to the embodiment of this invention.

FIG. 8 is an explanatory diagram of service takeover processing executed in the computer system according to the embodiment of this invention.

Specifically, FIG. 8 shows the service takeover processing executed when a failure occurs in the node 110 that is providing a service to the NAS client 160.

As shown in FIG. 5, when the FP1 (212) is operated in the node 110A, the FP2 (213) is operated in the node 110B, and the FP3 (214) is operated in the nodes 110C and 110D, the FP2 (213) detects a failure in a case where a failure occurs in the node 110A providing the service.

For example, when failure information contained in the response that the FP2 (213) has received from the FP1 (212) indicates that a failure has occurred in the node 110A, the FP2 (213) judges that a failure has occurred in the node 110A.

Alternatively, when the node 110A stops functioning due to the failure, the FP1 (212) becomes incapable of transmitting a response to the failure monitor request since the FP1 (212) transits to a stop status (status 304). Thus, when a response to the failure monitor request cannot be received at predetermined timings, the FP2 (213) may judge that a failure has occurred in the node 110A. For example, when a response cannot be received even after a predetermined time since the transmission of the failure monitor request, the FP2 (213) may judge that a failure has occurred in the node 110A. Alternatively, when a response cannot be received even after a predetermined time since the last reception of a response to the failure monitor request, the FP2 (213) may judge that a failure has occurred in the node 110A.

In this case, the FP2 (213) transmits a takeover node change request to the FP3 (214) operated in the node 110 most suited for the takeover node among the nodes 110 in which the FP3 (214) is currently operated. The takeover node change request in this case may be the same as that described with reference to FIG. 6. For example, as shown in FIG. 8, when the loads of the nodes 110C and 110D are 20% and 90%, respectively, the node 110C is more desirable to be set as the takeover node than the node 110D, for balancing the loads. Therefore, in this case, the FP2 (213) transmits the takeover node change request to the node 110C most suited for the takeover node.

After transmitting the takeover node change request, the FP2 (213) transits to the FP1 (212). The node 110B in which the FP1 (212) is newly operated provides the service to the NAS client 160 in place of the node 110A in which the failure has occurred.

The FP3 (214) operated in the node 110C that has received the takeover node change request transits to the FP2 (213) as described with reference to FIG. 6.

Figure 9:
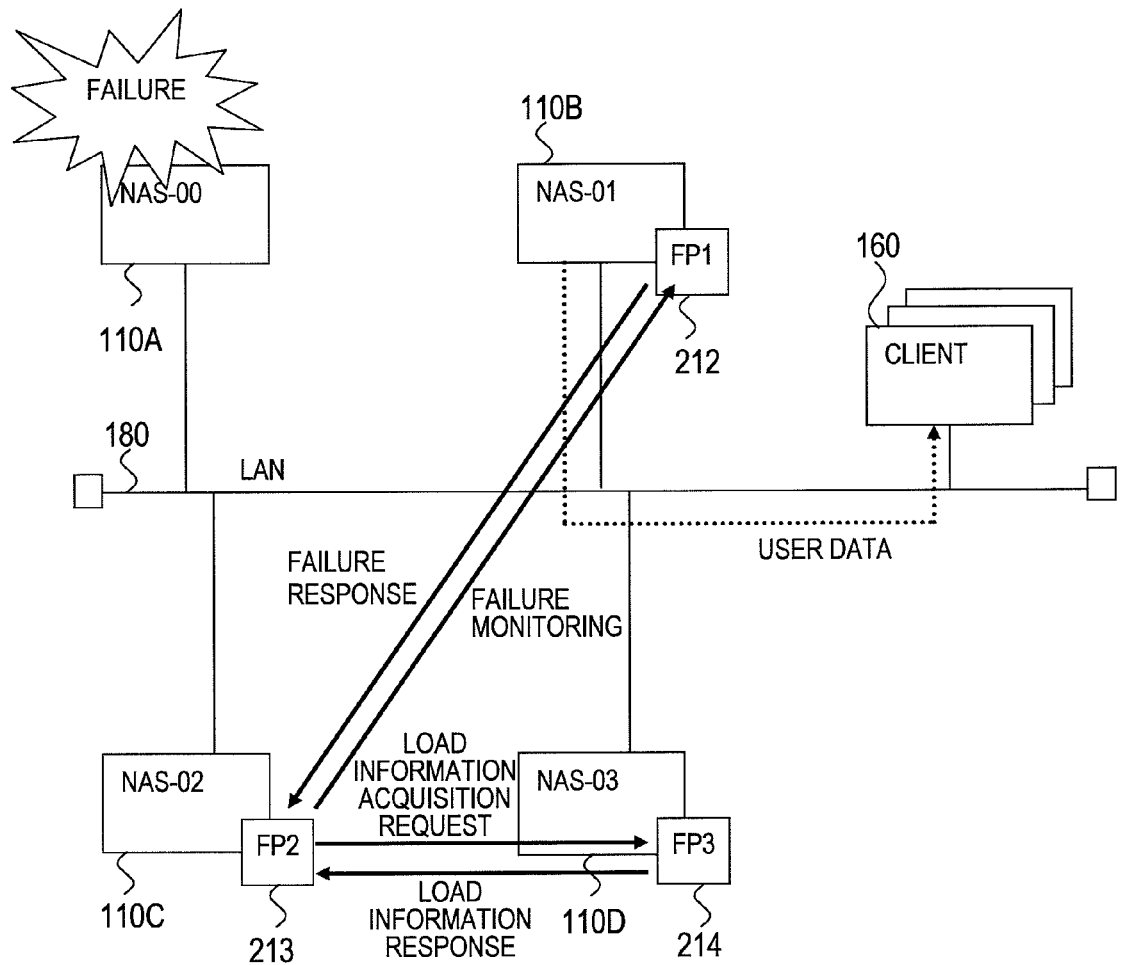
FIG. 9 is an explanatory diagram of the computer system after execution of a service takeover processing according to the embodiment of this invention.

FIG. 9 is an explanatory diagram of the computer system after execution of the service takeover processing according to the embodiment of this invention.

As a result of executing the service takeover processing shown in FIG. 8, the FP1 (212) is newly operated in the node 110B, the FP2 (213) is newly operated in the node 110C, and the FP3 (214) is successively operated in the node 110D. In other words, the node 110B in which the FP1 (212) is operated provides the service to the NAS client 160. The FP2 (213) operated in the node 110C monitors the node 110B providing the service. In addition, the FP2 (213) operated in the node 110C acquires the load information of the node 110D in which the FP3 (214) is operated. When a failure occurs in the node 110B, the node 110C takes over the service provision from the node 110B.

FIG. 10 is an explanatory diagram of a specific example of a file sharing service provided in the computer system according to the embodiment of this invention.

First, a description will be given of the file sharing service provided by NAS and of service information which is information necessary for providing the service.

The NAS provides the file sharing service to the clients. Specifically, a certain client arbitrarily stores a file in a file system on the NAS, whereby the file is shared with other clients.

In FIG. 10, each of the NAS clients 160A to 160C is one of the plurality of NAS clients 160. "Accounting Department: Ichiro Hitachi", "Accounting Department: Jiro Hitachi", and "General Affairs Department: Hanako Hitachi" shown in FIG. 10 are identifiers of users of the NAS clients 160A, 160B, and 160C, respectively. In this example, the identifier of each user is composed of a name of the department (e.g., Accounting Department) to which the user belongs and a name of the user (e.g., Ichiro Hitachi).

The node 110 provides file systems 1001 and 1002 to the NAS clients 160. "fs-keiri" and "fs-soumu" shown in FIG. 10 are identifiers of the file systems 1001 and 1002, respectively. In this example, the file system 1001 is a data storage area provided to the users who belong to the Accounting Department, and the file system 1002 is a data storage area provided to the users who belong to the General Affairs Department.

For example, a file "balancetable.xls" created by the user "Accounting Department: Ichiro Hitachi" is stored in the file system "fs-keiri". The stored file can also be referenced by the user "Accounting Department: Jiro Hitachi". On the other hand, a file created by the user "General Affairs Department: Hanako Hitachi" is stored in the file system "fs-soumu".

Therefore, for providing the file sharing service, the NAS needs to retain, as service information, information indicating a list of identifiers of data storage areas provided to users and identifiers of users permitted to access each of the data storage areas.

In the NAS, a file system is constructed in an arbitrary area of the disk device 120, and the OS of the node 110 recognizes the file system. Further, the OS stores a file of the user in the file system. The OS can recognize a plurality of file systems. Thus, the OS uses the identifier of the file system (i.e., file system ID) to identify the file system, and the user uses the file system ID in sharing the file.

Further, the NAS clients 160 access the service via the LAN 180. Therefore, for providing the service, an IP address of the node 110 that is providing the service is necessary.

In view of the above, the service information needs to contain at least user information (i.e., list of identifiers of users permitted for access), a file system ID, and an IP address of the node 110. In the example of FIG. 10, the node 110 retains as service information identifiers of the file systems 1001 and 1002, user information 1003, and an IP address 1004 ("192.168.10.1").

Upon reception of an access request (i.e., write request or read request) to any one of the file systems from the user using the NAS client 160, the node 110 collates the user identifier and the requested file system ID with the service information, to thereby judge whether the user is permitted to access the requested file system. When it is judged that the user is permitted of the access, the node 110 executes data write or data read according to the access request, and transmits the processing result to the NAS client 160 as a response.

Figure 11:
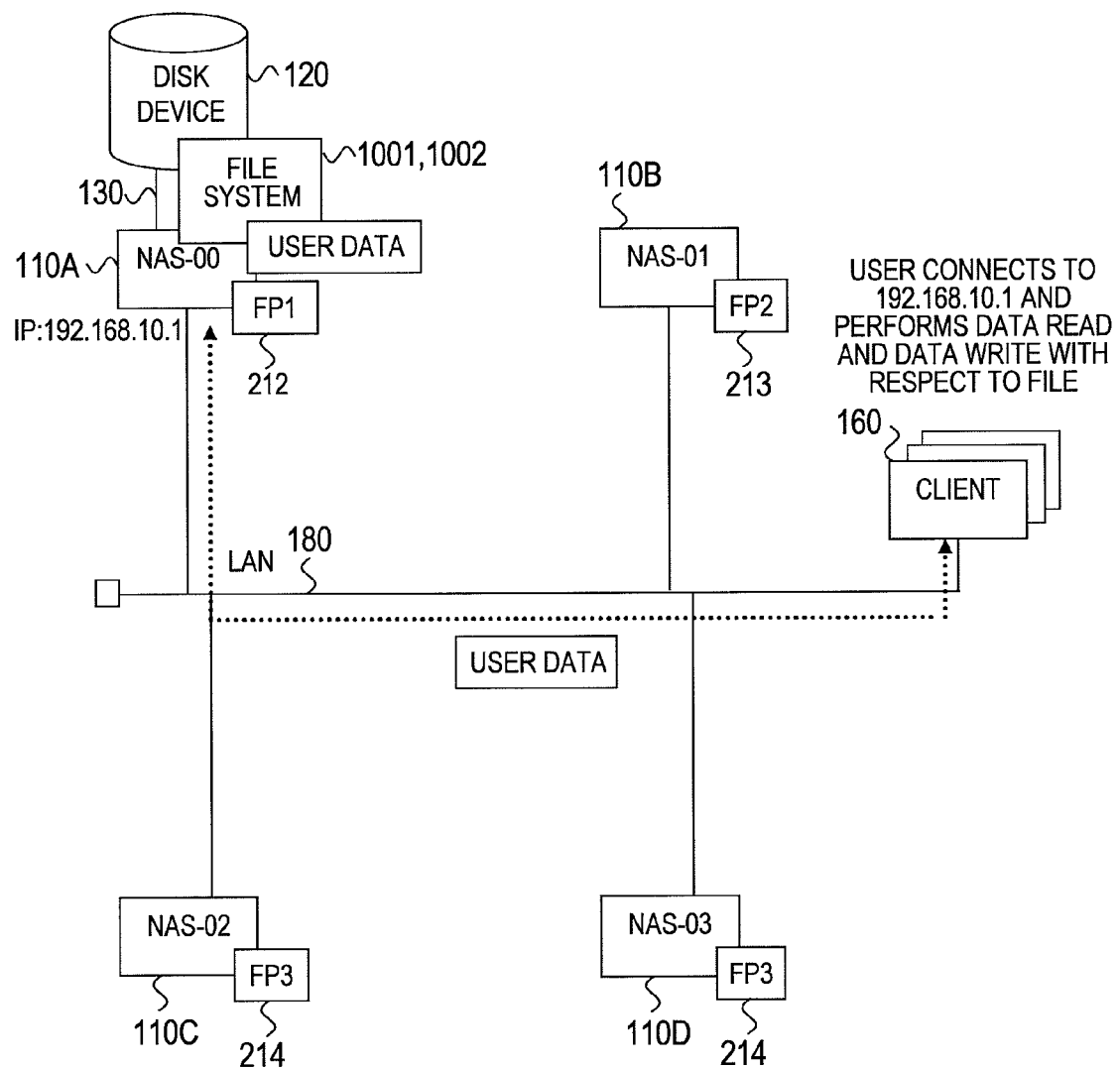
FIGS. 11 and 12 are explanatory diagrams each specifically showing the service takeover processing executed in the computer system according to the embodiment of this invention.
Figure 12:
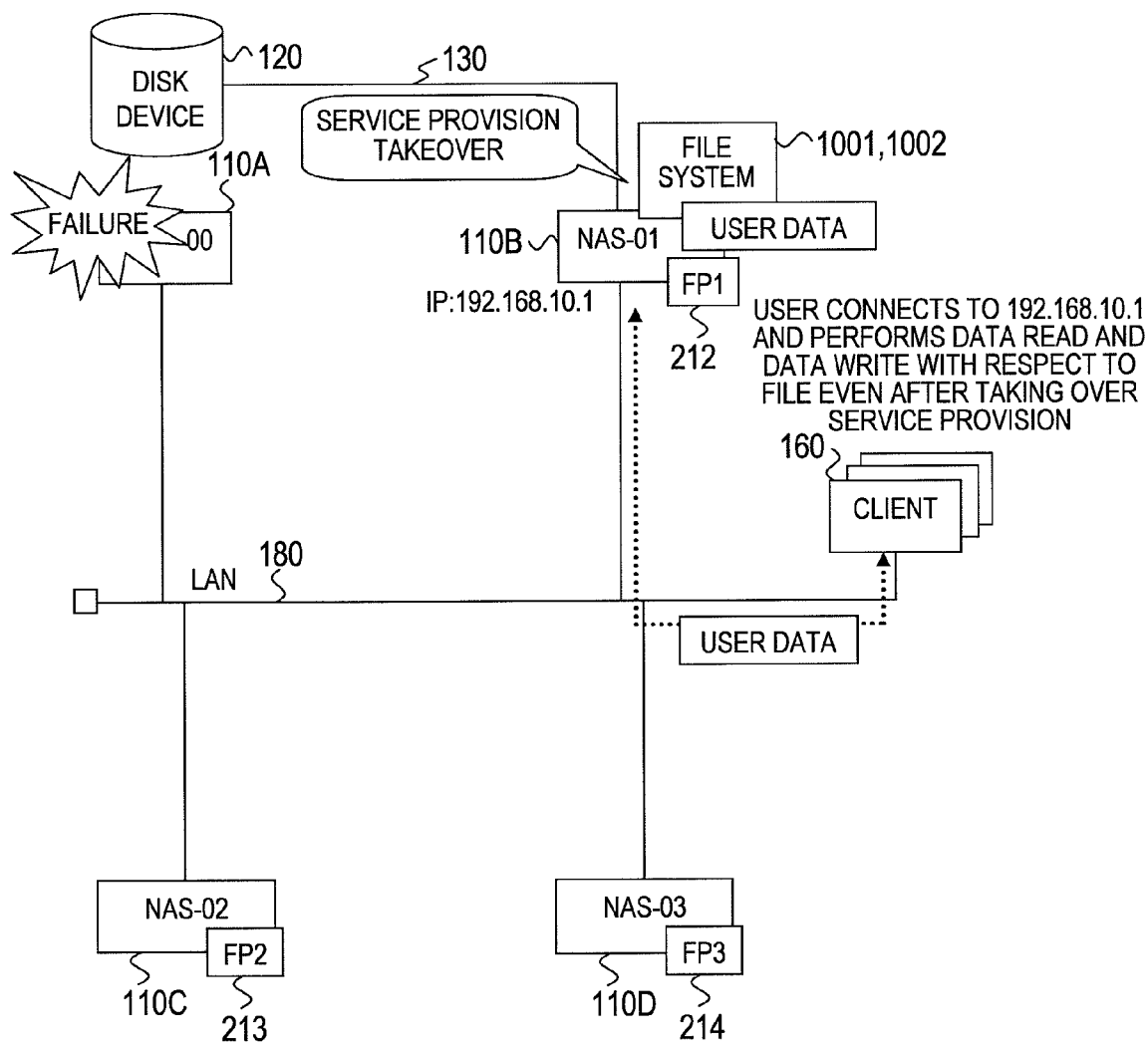

FIGS. 11 and 12 are explanatory diagrams each specifically showing the service takeover processing executed in the computer system according to the embodiment of this invention.

Specifically, FIG. 11 shows a status before the service is taken over and FIG. 12 shows a status where another node takes over the service provision of the node 110 in which a failure has occurred.

As shown in FIG. 11, the node 110A provides the file sharing service to the NAS client 160 at the beginning. Specifically, "192.168.10.1" shown in FIG. 10 is set as the IP address of the node 110A, for example. In addition, the node 110A retains as the service information the identifiers of the file systems 1001 and 1002 and the user information 1003 shown in FIG. 10, for example. In this case, the user of the NAS client 160 registered in the user information 1003 can access user data stored in the file system by connecting to the IP address "192.168.10.1". In other words, the IP address "192.168.10.1" is used as an access request destination when the user of the NAS client 160 accesses the file systems 1001 and 1002.

At this point of time, the FP1 (212) is operated in the node 110A, the FP2 (213) is operated in the node 110B, and the FP3 (214) is operated in the nodes 110C and 110D.

As described above with reference to FIG. 5, when there is a change in service information, the FP1 (212) operated in the node 110A incorporates the changed content into the response to the failure monitor request, and transmits the response to the FP2 (213) operated in the node 110B. Thus, the node 110B can retain the same service information as that retained by the node 110A.

After that, when a failure occurs in the node 110A providing the service, the node 110B in which the FP2 (213) has been operated takes over the service provision from the node 110A.

Specifically, an IP address "192.168.10.1" (i.e., address set to the node 110A that has provided the service) is newly set as the IP address of the node 110B. In addition, the node 110B retains the same service information as that retained in the node 110A. Accordingly, even after a failure occurs in the node 110A, the user registered in the user information 1003 can access the user data stored in the file system by connecting to the IP address "192.168.10.1" which is the same as that before the occurrence of the failure.

Figure 13:
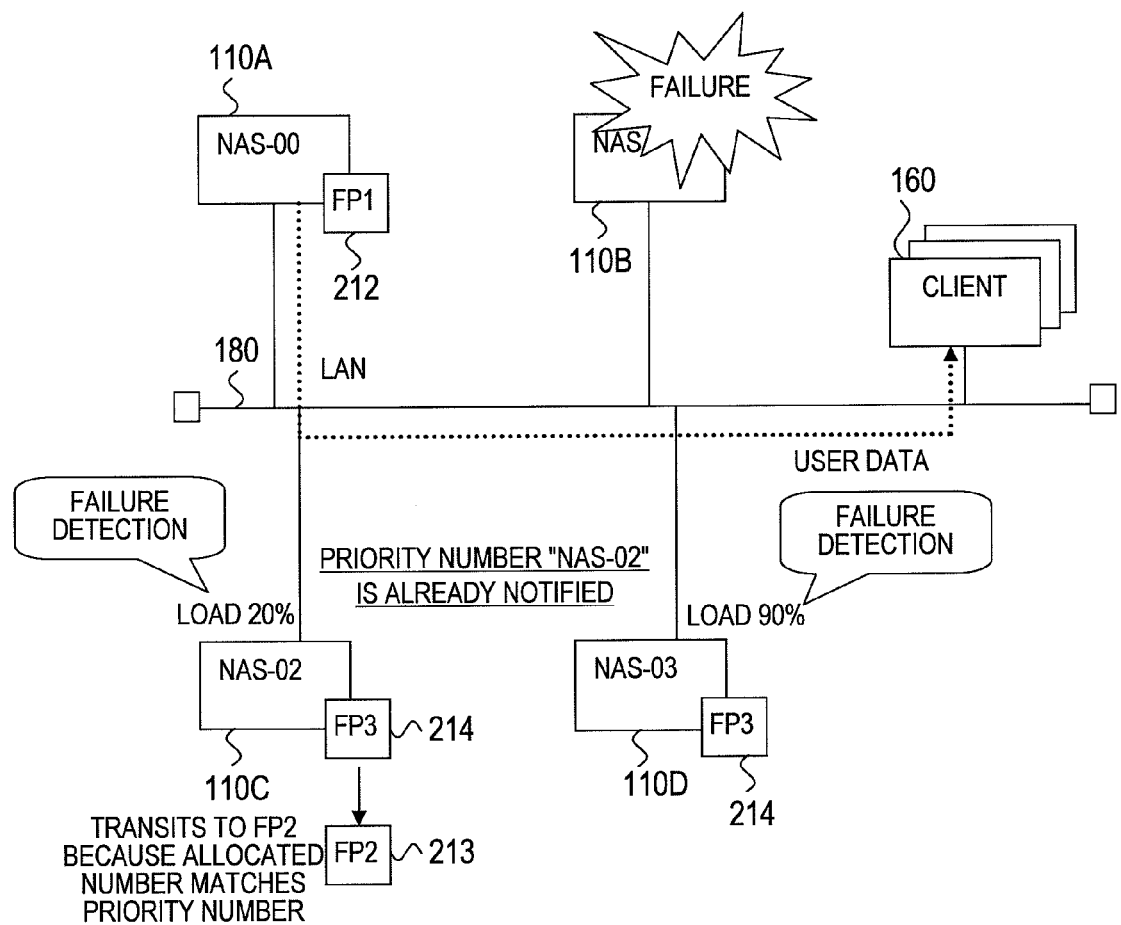
FIG. 13 is an explanatory diagram of processing executed when a failure occurs in a takeover node in the computer system according to the embodiment of this invention.

FIG. 13 is an explanatory diagram of processing executed when a failure occurs in the node 110 as the takeover node in the computer system according to the embodiment of this invention.

Specifically, FIG. 13 shows processing executed when a failure occurs in the node 110B shown in FIG. 5.

When a failure occurs in the node 110B, the FP2 (213) operated in the node 110B stops functioning, the status of which is shown in FIG. 3. If the status is left to be in the stop status, when a failure additionally occurs in the node 110A thereafter, the service provision is stopped since there exists no node 110 that is to take over the service provision from the node 11A. In other words, the node 110A becomes a single point failure. To avoid this situation, when the FP2 (213) stops functioning, it is necessary for any one of the operating FP3's (214) to transit to the FP2 (213) to be the new takeover node. FIG. 13 shows the processing for making the transition.

When the FP2 (213) stops functioning in the node 110B, the FP3 (214) operated in the nodes 110C and 110D fail to receive a load information acquisition request at predetermined timings. Thus, the FP3 (214) detects the failure of the node 110B. For example, when a next load information acquisition request is not received even after a predetermined time since the reception of the last load information acquisition request, the FP3 (214) may judge that a failure has occurred in the node 110 in which the FP2 (213) is operated.

In the example of FIG. 5, the FP3's (214) operated in the nodes 110C and 110D have already received the priority number "NAS-02" from the FP2 (213) prior to the occurrence of the failure. In this example, when a failure occurs in the node 110B, each of the FP3's (214) compares the identifier of the own node 110 in which the own FP3 (214) is operated with the received priority number.

Because the priority number "NAS-02" is the same as the identifier of the own node 110C, the FP3 (214) operated in the node 110C judges that the own FP3 (214) needs to transit to the FP2 (213). On the other hand, because the priority number "NAS-02" does not match the identifier "NAS-03" of the own node 110D, the FP3 (214) operated in the node 110D judges that the own FP3 (214) does not need to transit to the FP2 (213).

In this case, only the FP3 (214) operated in the node 110C transits to the FP2 (213).

Figure 14:
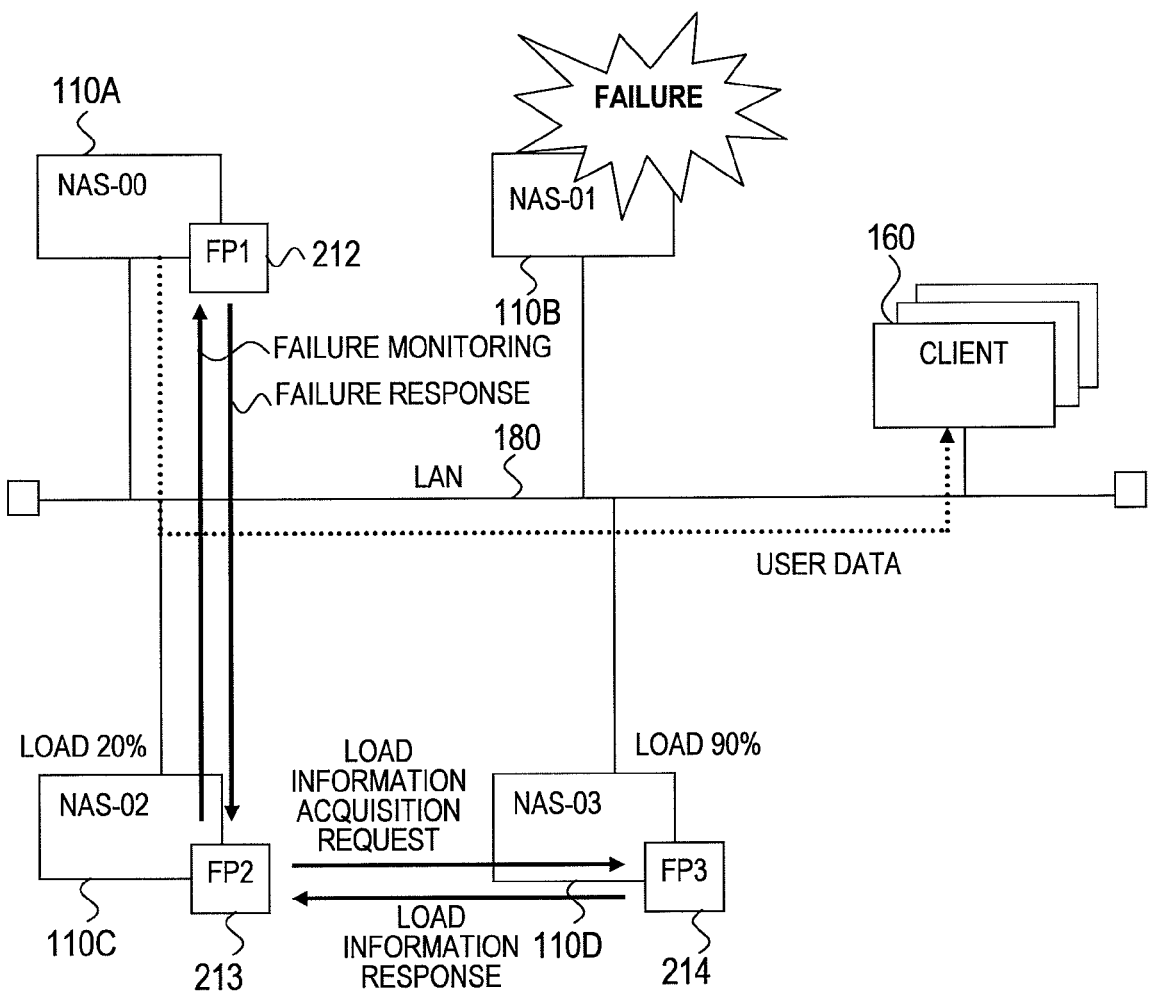
FIG. 14 is an explanatory diagram of the computer system after changing the takeover node according to the embodiment of this invention.

FIG. 14 is an explanatory diagram of the computer system after changing the takeover node according to the embodiment of this invention.

Specifically, FIG. 14 shows a status after the transition of the FP3 (214) operated in the node 110C to the FP2 (213) as shown in FIG. 13.

The FP2 (213) newly operated in the node 110C monitors the node 110A by transmitting a failure monitor request. Further, the FP2 (213) acquires the load information of the node 110D by transmitting a load information acquisition request. After that, when a failure occurs in the node 110A, the node 110C takes over the service provision from the node 110A.

Figure 15:
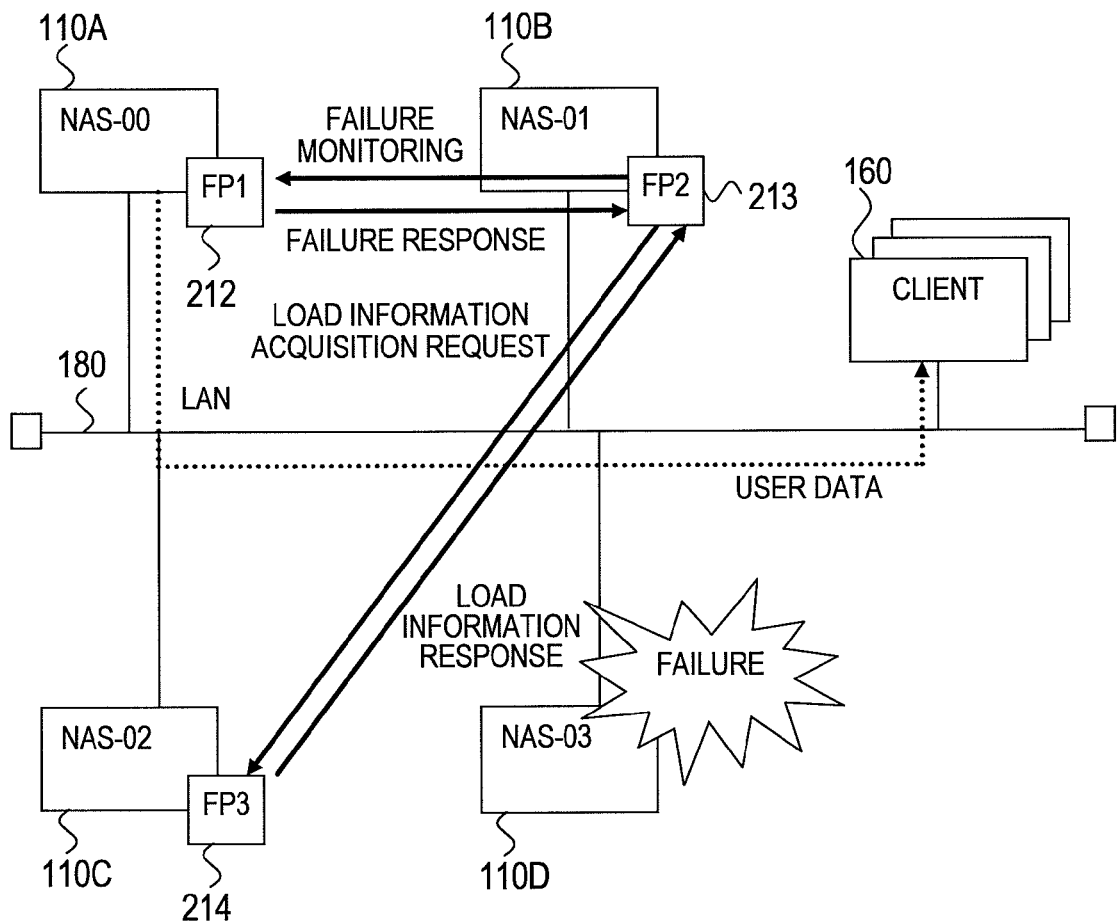
FIG. 15 is an explanatory diagram of processing executed when a failure occurs in a standby node 110 in the computer system according to the embodiment of this invention.

FIG. 15 is an explanatory diagram of processing executed when a failure occurs in the standby node 110 in the computer system according to the embodiment of this invention.

Specifically, FIG. 15 shows processing executed when a failure occurs in the node 110D which is one of the standby nodes 110 (i.e., nodes 110 in which the FP3 (214) is operated) in the computer system shown in FIG. 5.

When a failure occurs in the node 110D, the FP3 (214) operated in the node 110D stops functioning, the status of which is shown in FIG. 3. Thus, the node 110D becomes incapable of transmitting a response to the load information acquisition request transmitted from the FP2 (213) of the node 110B. Based on the description above, the FP2 (213) judges that a failure has occurred in the node 110D. For example, when a response is not received even after a predetermined time since the transmission of the load information acquisition request to the node 110D, the FP2 (213) may judge that a failure has occurred in the node 110D.

In this case, no status transition is made in the failover program 210 operated in the node 110 without any failure. Therefore, the node 110A keeps providing the service and the FP2 (213) operated in the node 110B keeps monitoring the node 110A and acquiring the load information of the node 110C.

Figure 16:
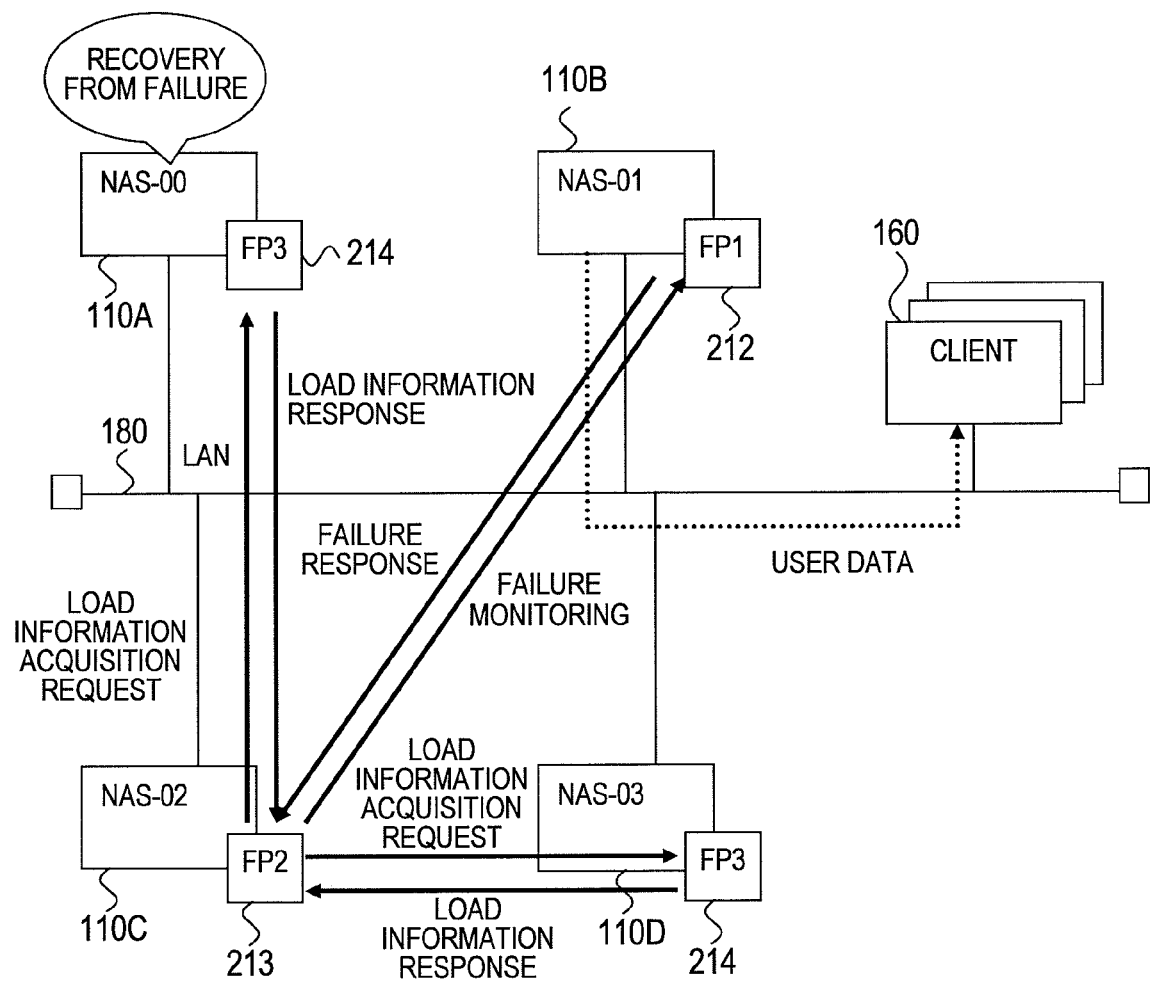
FIG. 16 is an explanatory diagram of processing executed when the node recovers from a failure in the computer system according to the embodiment of this invention.

FIG. 16 is an explanatory diagram of processing executed when the node 110 recovers from a failure in the computer system according to the embodiment of this invention.

Specifically, FIG. 16 shows processing executed when, after a failure occurs in the node 110A and the node 110B takes over the service provision from the node 110A as shown in FIG. 9, the node 110A recovers from the failure.

The failover program 210 is activated in the node 110A that has recovered from the failure. The rank operated right after the activation is the FP3 (214), the status of which is shown in FIG. 3. The FP3 (214) operated in the node 110A responds to the load information acquisition request transmitted from the FP2 (213) operated in the node 110C. After that, when the load information satisfies the predetermined condition, the takeover node is changed through the status transition, the procedure of which is the same as those shown in FIGS. 6 and 7.

The above description exemplifies the case where the NAS provides only one service, that is, the case where only one node 110 provides the service. However, in actuality, this invention can also be applied to a case where the NAS provides a plurality of services, that is, a case where a plurality of nodes 110 provide services.

Figure 17:
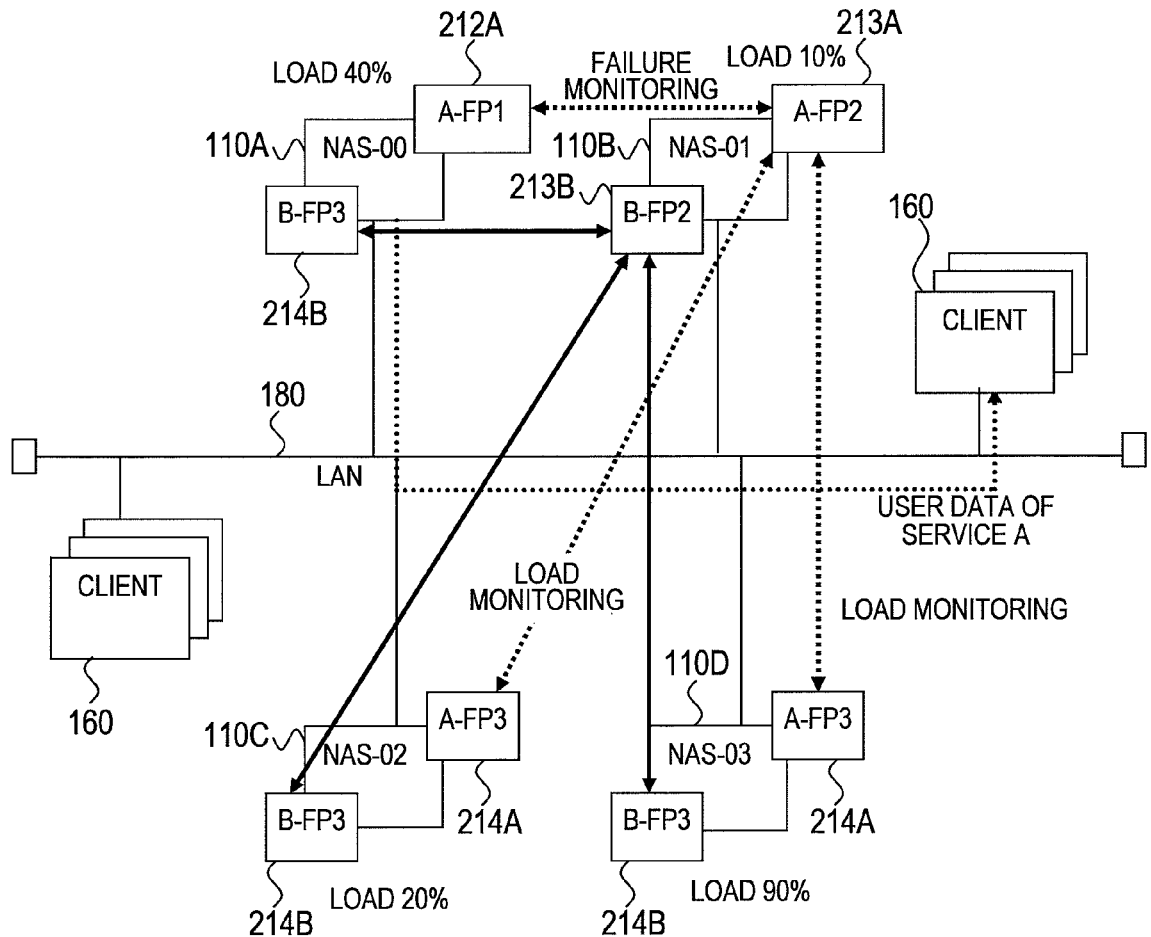
FIGS. 17 and 18 are explanatory diagrams each showing processing executed when a service to be provided is added in the computer system according to the embodiment of this invention.
Figure 18:
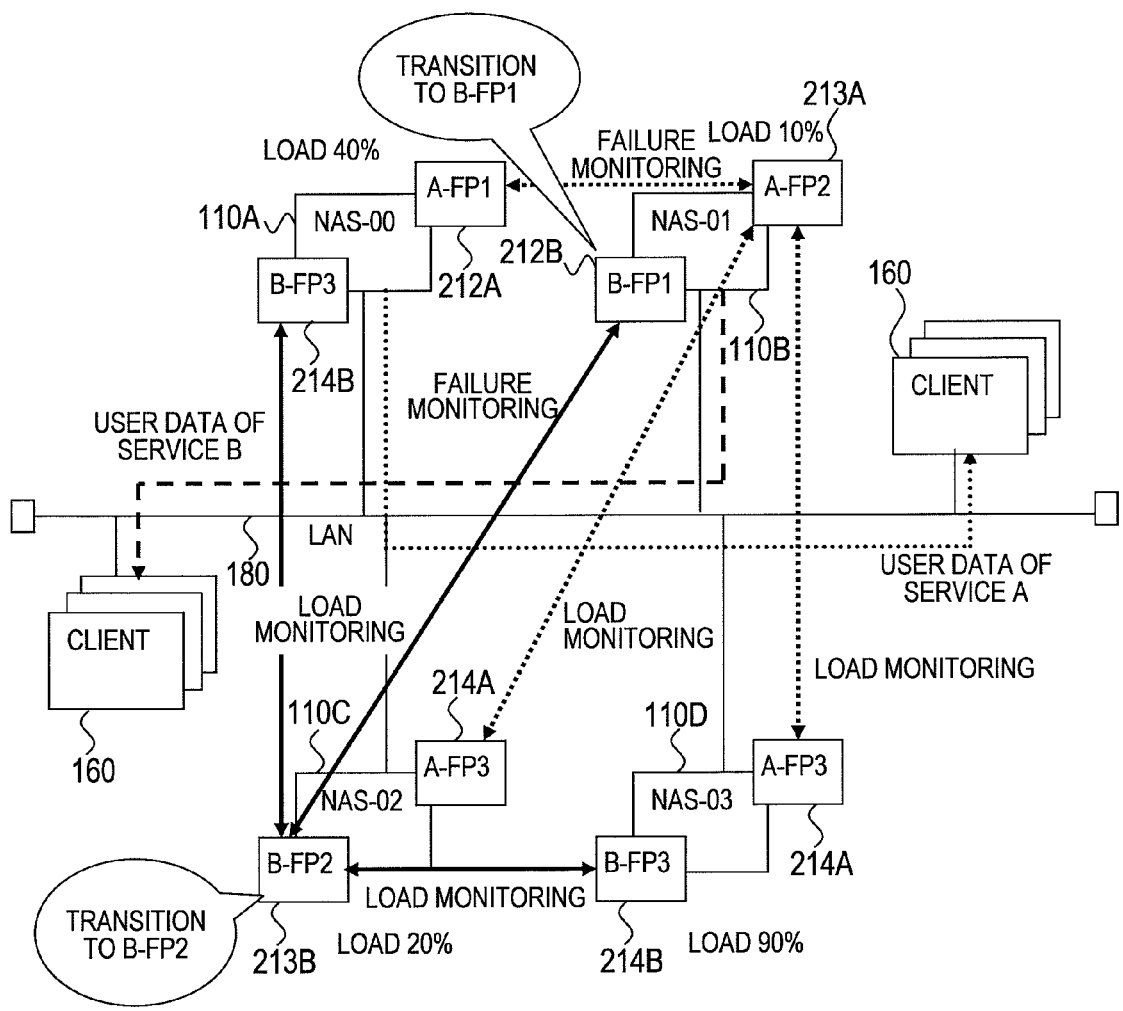

FIGS. 17 and 18 are explanatory diagrams each showing processing executed when a service to be provided is added in the computer system according to the embodiment of this invention.

FIG. 17 shows a status of the computer system right after another service (i.e., a service B) is added to the NAS that is already providing a service (i.e., a service A).

At the beginning, only the service A is provided. At this point of time, the node 110A provides the service A to the NAS client 160, the node 110B is set as the takeover node for the service A, and the nodes 110C and 110D are set as standby nodes for the service A. In the description below, the FP1, the FP2, and the FP3 to which "A" has been assigned are operated for managing a failover of the service A. For example, an A-FP1 (212A) is operated in the node 110A, an A-FP2 (213A) is operated in the node 110B, and an A-FP3 (214A) is operated in the nodes 110C and 110D. The A-FP1 (212A), the A-FP2 (213A), and the A-FP3 (214A) respectively correspond to the FP1 (212), the FP2 (213), and the FP3 (214) generated for managing the failover of the service A.

After that, provision of the service B is added. For example, the user instructs provision of the service B to the node 110B. Specifically, the user inputs to the node 110B service information necessary for providing the service B, to thereby instruct the provision of the service B. At this time, the FP management program 211 of the node 110B generates a B-FP2 (213B). In the description below, the FP1, the FP2, and the FP3 that are operated for managing the failover of the service B are assigned with "B" and displayed.

In addition, the FP management program 211 of the node 110B transmits service information on the service B to the FP management programs 211 of the nodes 110A, 110C, and 110D. The FP management programs 211 of the nodes 110 that have received the service information generate a B-FP3 (214B) in the respective nodes 110. At this point of time, there exists no node 110 in which the B-FP1 (212B) is operated. It should be noted that the B-FP1 (212B), the B-FP2 (213B), and the B-FP3 (214B) respectively correspond to the FP1 (212), the FP2 (213), and the FP3 (214) generated for managing the failover of the service B.

The FP1's, the FP2's, and the FP3's that manage failovers of different services are operated independently. Thus, the FP1, the FP2, and the FP3 for managing the failover of one service cannot communicate with the FP1, the FP2, and the FP3 for managing another service. For example, the B-FP2 (213B) can communicate with the B-FP1 (212B) and the B-FP3 (214B), but cannot communicate with the A-FP1 (212A) and the A-FP3 (214A).

The B-FP2 (213B) that has started operating acquires load information of the nodes 110 by transmitting a load information acquisition request to the B-FP3's (214) operated in the respective nodes 110. In addition, the B-FP2 (213B) transmits a failure monitor request. However, because the B-FP1 (212B) is not operated in any of the nodes 110 at this point of time, the B-FP2 (213B) cannot receive a response to the failure monitor request. In this case, the status transition is caused as described above with reference to FIGS. 8 and 9.

FIG. 18 shows a status of the computer system after the status transition from the state shown in FIG. 17.

The B-FP2 (213B) that has been operated in the node 110B transits to the B-FP1 (212B). Further, for example, when the loads of the nodes 110A, 110C, and 110D are 40%, 20%, and 90%, respectively, the B-FP3 (214B) that has been operated in the node 110C having the smallest load transits to the B-FP2 (213B).

After that, a group of the A-FP1 (212A), A-FP2 (213A), and A-FP3 (214A), and a group of the B-FP1 (212B), B-FP2 (213B), and B-FP3 (214B) independently execute the processing shown in FIG. 5 to FIG. 16.

Figure 19:
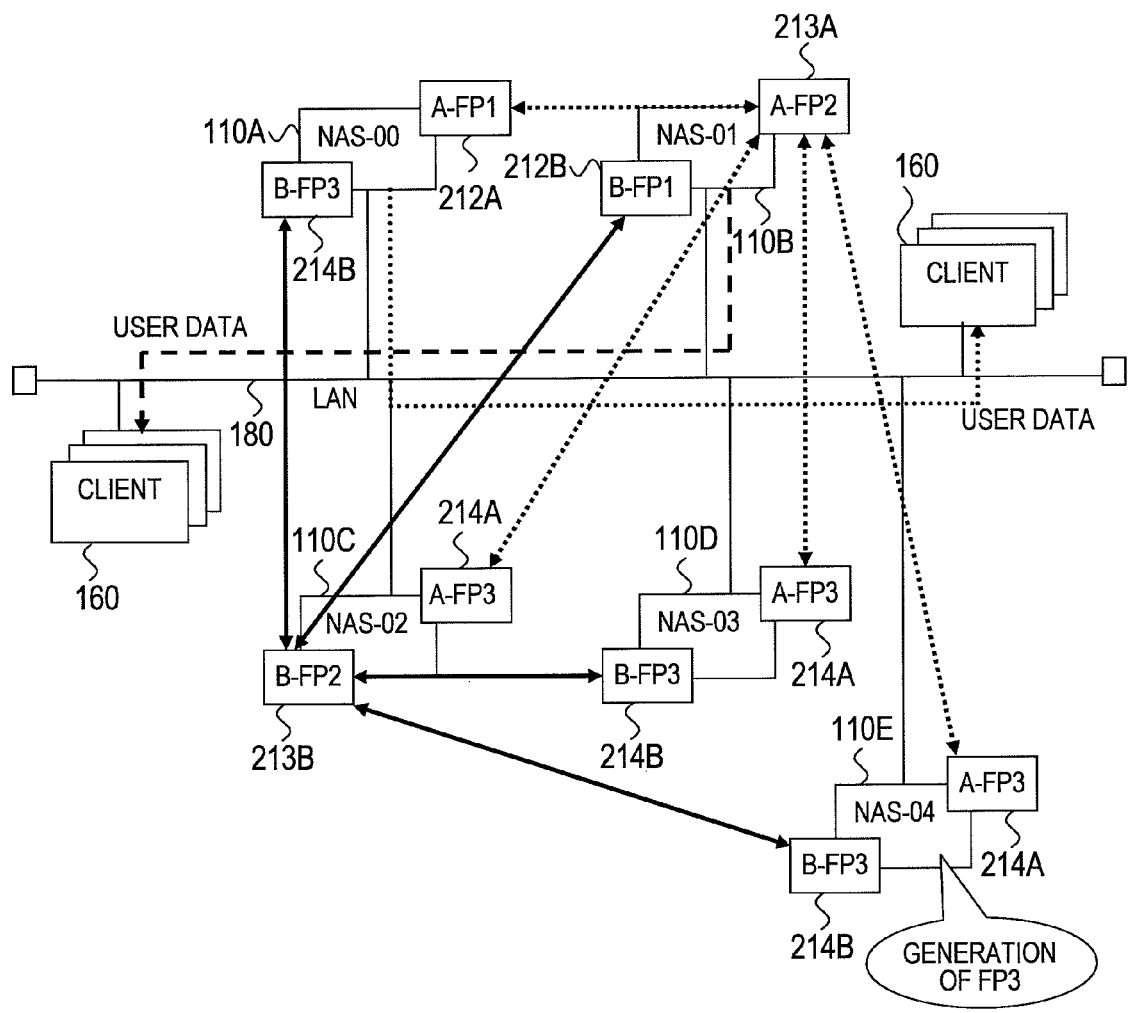
FIG. 19 is an explanatory diagram of processing executed when a new node is added in the computer system according to the embodiment of this invention.

FIG. 19 is an explanatory diagram of processing executed when a new node 110 is added in the computer system according to the embodiment of this invention.

Specifically, FIG. 19 shows an example in which a node 110E identified by an identifier "NAS-04" is added to the computer system shown in FIG. 18.

In this case, the FP management program 211 of the node 110E acquires service information from the FP management programs 211 of the nodes 110A to 110D. In the example of FIG. 19, the FP management program 211 of the node 110A transmits to the FP management program 211 of the node 110E the service information on the service A managed by the A-FP1 (212A). In addition, the FP management program 211 of the node 110B transmits to the FP management program 211 of the node 110E the service information on the service B managed by the B-FP1 (212B).

By receiving those pieces of service information, the FP management program 211 of the node 110E can grasp that two types of services, that is, the service A and the service B are currently provided. Then, the FP management program 211 of the node 110E generates an A-FP3 (214A) and a B-FP3 (214B) in the node 110E. After that, the failover program 210 of the respective nodes 110 executes the processing as shown in FIG. 5 to FIG. 18.

Next, a description will be given of the control information 215 managed by the failover program 210.

FIG. 20 is an explanatory diagram showing an example of control information 215 retained in the node 110 according to the embodiment of this invention.

Specifically, FIG. 20 exemplifies control information 215 retained in the node 110B in the computer system shown in FIG. 18.

The control information 215 contains an own node ID 2001, a service 2002, a client 2003, an own node rank 2004, an FP1 2005, an FP2 2006, an FP3 2007, a priority number 2008, and takeover information 2009.

The own node ID 2001 is an identifier of the own node 110, that is, the node 110 retaining the control information 215. In FIG. 20, for illustrating the control information 215 retained in the node 110B, "NAS-01" which is the identifier of the node 110B is retained as the own node ID 2001.

The own node ID 2001 further includes a value indicating a load of the own node 110. In FIG. 20, the value indicating the load of the own node 110 is displayed in the parenthesis. The load of the own node 110 may be, for example, a usage ratio (%) of the CPU 202. In the example of FIG. 20, "10" (%) is retained as the load of the own node 110B.

The service 2002 is an identifier of the file sharing service in which the own node 110 is involved. The file sharing service in which the own node 110 is involved is a service corresponding to the FP1 (212), the FP2 (213), or the FP3 (214) that are operated in the own node 110. In the example of FIG. 18, the A-FP2 (213A) corresponding to the service A and the B-FP1 (212B) corresponding to the service B are operated in the node 110B. Thus, in the example of FIG. 20, an identifier "A" of the service A and an identifier "B" of the service B are retained as the service 2002.

The client 2003 is an identifier of the NAS client 160 that is to receive the provision of each service identified by the identifier retained as the service 2002. In the example of FIG. 20, "1" and "2" are retained as the client 2003 corresponding to the services A and B, respectively.

The own node rank 2004 is a rank of the failover program 210 operated in the own node 110 in correspondence with each service. In the example of FIG. 20, "FP2" corresponding to the service A and "FP1" corresponding to the service B are retained as the own node rank 2004.

The FP1 2005 is an identifier of the node 110 in which the FP1 (212) corresponding to each service is operated. In the example of FIG. 18, the A-FP1 (212A) corresponding to the service A is operated in the node 110A. Thus, in the example of FIG. 20, an identifier "NAS-00" of the node 110A is retained as the FP1 2005 corresponding to the service A. On the other hand, in the example of FIG. 18, the B-FP1 (212B) corresponding to the service B is operated in the own node 110B. In this case, in the example of FIG. 20, an effective value does not need to be retained as the FP1 2005 corresponding to the service B.

The FP2 2006 is an identifier of the node 110 in which the FP2 (213) corresponding to each service is operated. In the example of FIG. 18, the A-FP2 (213A) corresponding to the service A is operated in the own node 110B. In this case, in the example of FIG. 20, an effective value does not need to be retained as the FP2 2006 corresponding to the service A. On the other hand, in the example of FIG. 18, the B-FP2 (213B) corresponding to the service B is operated in the node 110C. Thus, in the example of FIG. 20, an identifier "NAS-02" of the node 110C is retained as the FP2 2006 corresponding to the service B.

The FP3 2007 is an identifier of the node 110 in which the FP3 (214) corresponding to each service is operated. In the example of FIG. 18, the A-FP3 (214A) corresponding to the service A is operated in the nodes 110C and 110D. Thus, in the example of FIG. 20, identifiers "NAS-02" and "NAS-03" of the nodes 110C and 110D, respectively, are retained as the FP3 2007 corresponding to the service A. On the other hand, in the example of FIG. 18, the B-FP3 (214B) corresponding to the service B is operated in the nodes 110A and 110D. Thus, in the example of FIG. 20, identifiers "NAS-00" and "NAS-03" of the nodes 110A and 110D, respectively, are retained as the FP3 2007 corresponding to the service B.

When the rank of the own node 110 is the FP2 (213), load information of each of the nodes 110 acquired by the FP2 (213) is retained as the FP3 2007. In the example of FIG. 18, the rank of the own node 110B corresponding to the service A is an FP2 (213). Thus, in the example of FIG. 20, a load "20" of the node 110C and a load "90" of the node 110D are retained as the FP3 2007 corresponding to the service A. In FIG. 20, those loads are displayed in parentheses.

The priority number 2008 is a priority number that the FP3 (214) operated in the own node 110 has received from the FP2 (213) operated in the other node 110. In the example of FIG. 18, the FP3 (214) is not operated in the own node 110B. Thus, in the example of FIG. 20, no effective value is retained as the priority number 2008.

The takeover information 2009 is service information necessary for each node to provide the file sharing service to the NAS client 160. The service information is acquired from a response to the failure monitor request. The service information includes, for example, user information indicating a user permitted to receive service provision, an identifier of the file system provided by the service, and an IP address of the node 110 used for providing the service.

The takeover node (i.e., node in which the FP2 (213) is operated) needs to retain the service information for taking over the service provision. In the example of FIG. 18, because the own node 110B is a takeover node of the service A, the own node 110B retains the service information on the service A as the takeover information 2009. For example, when the service A is a service for providing access to the file system "FS1" to the users belonging to the General Affairs Department and when the IP address "192.168.10.1" is used therefor, the "General Affairs Department", "FS1", and "192.168.10.1" are retained as the takeover information 2009 corresponding to the service A.

In addition, the own node 110B is providing the service B, so the service information on the service B is retained as the takeover information 2009. For example, when the service B is a service for providing access to the file system "FS2" to the users belonging to the Accounting Department and when the IP address "192.168.10.2" is used therefor, the "Accounting Department", "FS2", and "192.168.10.2" are retained as the takeover information 2009 corresponding to the service B.

FIG. 21 is an explanatory diagram showing another example of the control information 215 retained in the node 110 according to the embodiment of this invention.

Specifically, FIG. 21 exemplifies the control information 215 retained in the node 110C of the computer system shown in FIG. 18.

Descriptions on each items of the control information 215 are the same as those described above with reference to FIG. 20. Thus, descriptions thereof will be omitted. Hereinafter, a description will be given of exemplary specific values retained as the control information 215 in the node 110C.

"NAS-02" that is the identifier of the node 110C is retained as the own node ID 2001. In addition, "20" (%) is retained as the load of the own node 110C.

Values retained as the service 2002 and the client 2003 are the same as those shown in FIG. 20.

In the example of FIG. 18, the A-FP3 (214A) corresponding to the service A and the B-FP2 (213B) corresponding to the service B are operated in the node 110C. Thus, in the example of FIG. 21, "FP3" corresponding to the service A and "FP2" corresponding to the service B are retained as the own node rank 2004.

In the example of FIG. 18, the A-FP1 (212A) corresponding to the service A is operated in the node 110A. Thus, in the example of FIG. 21, the identifier "NAS-00" of the node 110A is retained as the FP1 2005 corresponding to the service A. On the other hand, in the example of FIG. 18, the B-FP1 (212B) corresponding to the service B is operated in the node 110B. Thus, in the example of FIG. 21, the identifier "NAS-01" of the node 110B is retained as the FP1 2005 corresponding to the service B.

In the example of FIG. 18, the A-FP2 (213A) corresponding to the service A is operated in the node 110B. Thus, in the example of FIG. 21, the identifier "NAS-01" of the node 110B is retained as the FP2 2006 corresponding to the service A. On the other hand, in the example of FIG. 18, the B-FP2 (213B) corresponding to the service B is operated in the own node 110C. In this case, in the example of FIG. 21, an effective value does not need to be retained as the FP2 2006 corresponding to the service B.

In the example of FIG. 18, the A-FP3 (214A) corresponding to the service A is operated in the own node 110C and the node 110D. Thus, in the example of FIG. 21, at least the identifier "NAS-03" of the node 110D is retained as the FP3 2007 corresponding to the service A. On the other hand, in the example of FIG. 18, the B-FP3 (214B) corresponding to the service B is operated in the nodes 110A and 110D. Thus, in the example of FIG. 21, the identifiers "NAS-00" and "NAS-03" of the nodes 110A and 110D, respectively, are retained as the FP3 2007 corresponding to the service B.

In the example of FIG. 18, the rank of the own node 110C corresponding to the service B is an FP2 (213). Thus, in the example of FIG. 21, a load "40" of the node 110A and a load "90" of the node 110D are additionally retained as the FP3 2007 corresponding to the service B.

In the example of FIG. 18, the A-FP3 (214A) corresponding to the service A is operated in the own node 110C. Thus, the node 110C receives a priority number from the A-FP2 (213A) operated in the node 110B. When the load of the node 110C is smaller than the load of the node 110D as shown in FIG. 18, the identifier "NAS-02" of the node 110C is transmitted as the priority number. Thus, in the example of FIG. 21, "NAS-02" is retained as the priority number 2008 corresponding to the service A. Assuming that the load of the node 110D is smaller than the load of the node 110C, the identifier "NAS-03" of the node 110D is transmitted as the priority number. Therefore, "NAS-03" is retained as the priority number 2008.

The takeover information 2009 is the same as that described above with reference to FIG. 20. Therefore, a description thereof will be omitted. It should be noted that the FP3 (214) can acquire service information from the load information acquisition request received from the FP2 (213).

Next, processing executed by the failover program 210 of each node 110 will be described with reference to the flowcharts. The flowcharts are used for specifically describing the processing of this embodiment described above with reference to FIGS. 3 to 19.

Figure 22:
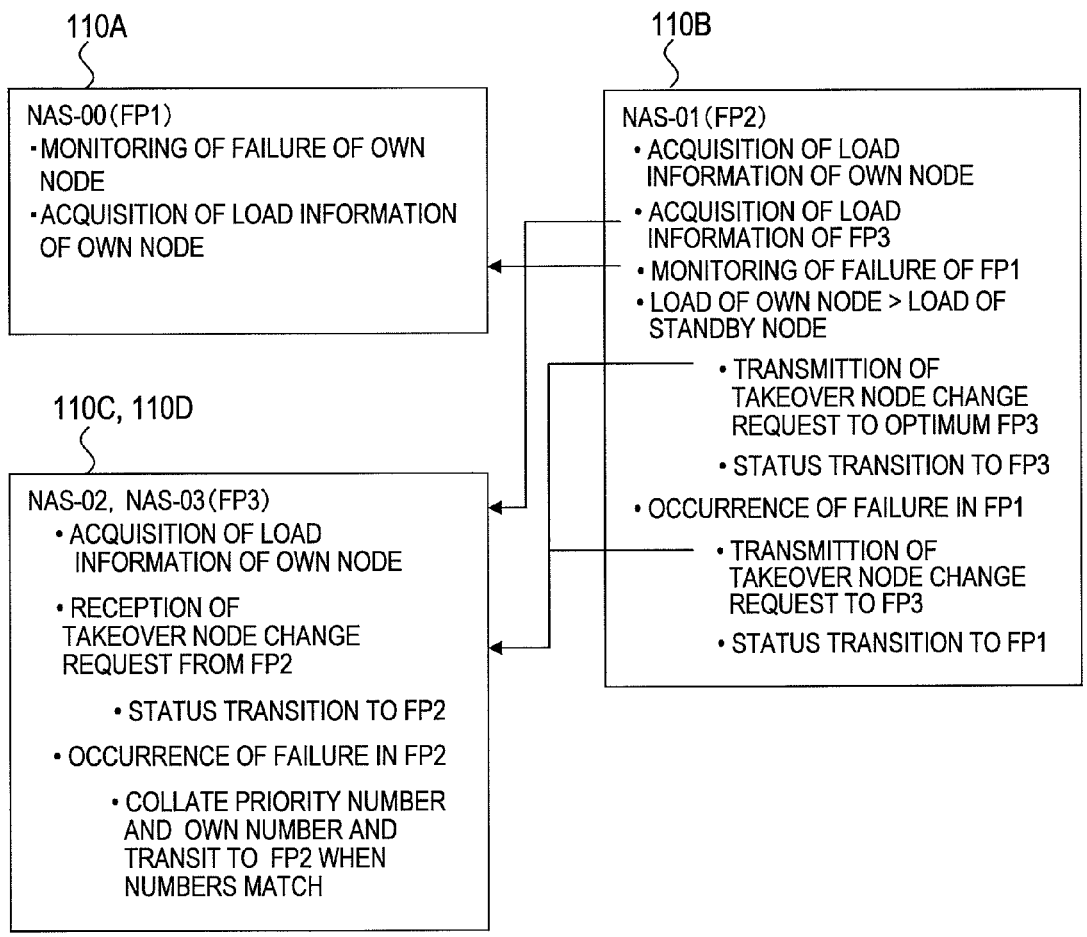
FIG. 22 is an explanatory diagram schematically showing processing executed by the failover program according to the embodiment of this invention.

FIG. 22 is an explanatory diagram schematically showing processing executed by the failover program 210 according to the embodiment of this invention.

Specifically, FIG. 22 shows an overview of the processing executed by the failover program 210 of each rank in the case where the FP1 (212) is operated in the node 110A (NAS-00), the FP2 (213) is operated in the node 110B (NAS-01), and the FP3's (214) are operated in the nodes 110C and 110D (NAS-02 and NAS-03) as shown in FIG. 5.

The FP1 (212) monitors a failure of the own node 110A. In addition, the FP1 (212) acquires the load information of the own node 110A.

The FP2 (213) acquires the load information of the own node 110B. In addition, the FP2 (213) acquires from the FP3's (214) the load information of the nodes 110C and 110D in which the FP3's (214) are respectively operated. Further, the FP2 (213) monitors a failure of the node 110A.

Further, when the load of the own node 110B satisfies the predetermined condition, the FP2 (213) transits to the FP3 (214) after transmitting a takeover node change request to the appropriate FP3 (214). For example, when the load of the own node 110B is larger than the load of the node 110C or 110D which is the standby node, it may be judged that the load of the own node 110B satisfies the predetermined condition. Alternatively, when the load of the own node 110B is larger than the load of the node 110A currently providing the service, it may be judged that the load of the own node 110B satisfies the predetermined condition.

Further, when a failure occurs in the node 110A, the FP2 (213) transits to the FP1 (212) after transmitting the takeover node change request to the appropriate FP3 (214).

The FP3 (214) acquires the load information of the own node 110C or 110D. Upon reception of the takeover node change request from the FP2 (213), the FP3 (214) that receives the request transits to the FP2 (213). When a failure occurs in the node 110B in which the FP2 (213) is operated, the FP3 (214) collates the priority number with the identifier of the own node 110C or 110D, and transits to the FP2 (213) when the priority number and the identifier match each other.

Figure 23:
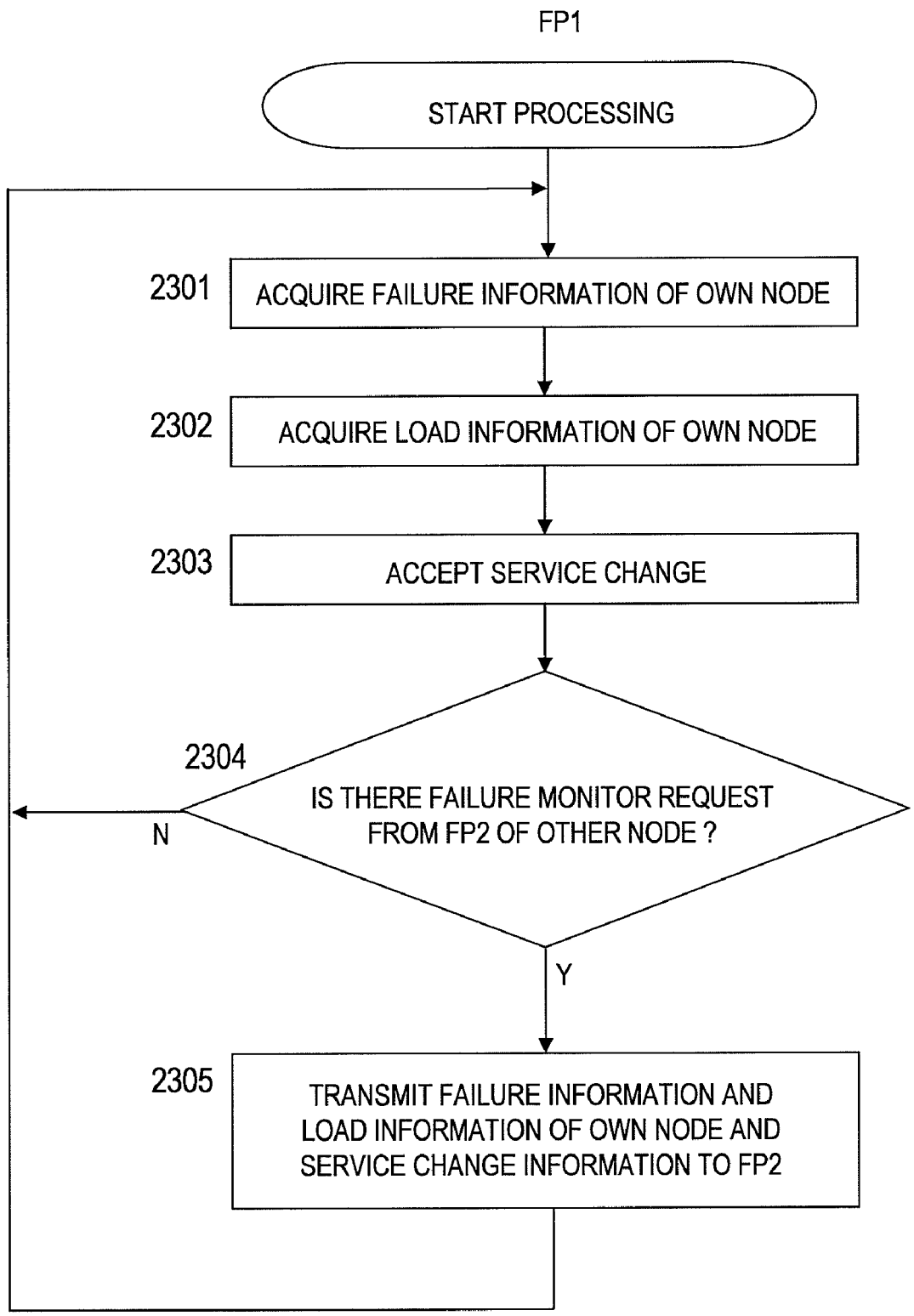
FIG. 23 is a flowchart of processing executed by an FP1 according to the embodiment of this invention.

FIG. 23 is a flowchart of processing executed by the FP1 (212) according to the embodiment of this invention.

Upon start of the processing, the FP1 (212) acquires failure information of the own node 110 (i.e., node 110 in which the FP1 (212) is operated) (Step 2301). Here, the term "failure" refers to a failure in hardware such as the CPU 202, the memory 204, the I/F 201, and the I/F 203, and software failure such as improper shutdown of a program operated in the own node 110. The failure information includes at least information indicating whether the hardware failure or the software failure has occurred, but does not need to include information indicating a specific content of the failure.

Next, the FP1 (212) acquires the load information of the own node 110 (Step 2302). The load information contains a load index value. The load index value is a value indicating the load of the node 110. The load index value is a value obtained through calculation based on at least one of, for example, a usage ratio of the CPU 202, a usage ratio of the memory 204, a usage ratio of network resources, an I/O rate of the disk device 120, the number of operating processes, and the number of processes of the FP1 (212) and the FP2 (213) operated in the own node 110.

Subsequently, the FP1 (212) receives service change information (Step 2303). The service change information is information indicating a change of the service information. As described above with reference to FIG. 10, the service information is information necessary for the node 110 to provide a service. The service information is, for example, information indicating an added/deleted user account or a changed right to access.

Next, the FP1 (212) judges whether a failure monitor request has been received from the FP2 (213) operated in the other node 110 (Step 2304).

When it is judged in Step 2304 that the failure monitor request has been received, the FP1 (212) transmits the failure information of the own node 110, the load information of the own node 110, and the service change information to the transmission source of the failure monitor request (Step 2305). After that, the process returns to Step 2301.

On the other hand, when it is judged in Step 2304 that the failure monitor request has not been received, the FP1 (212) returns to Step 2301 without executing the process of Step 2305.

Figure 24:
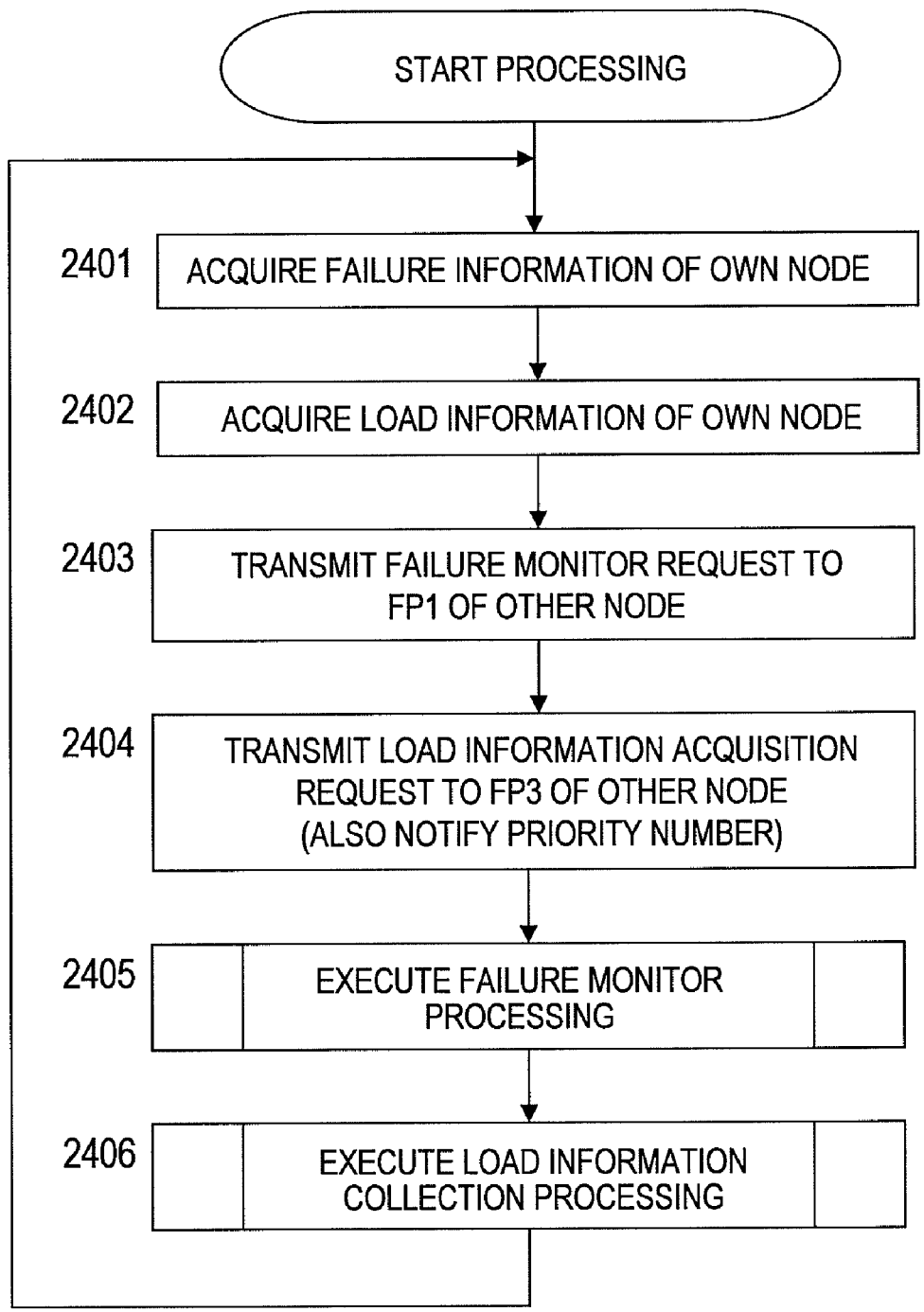
FIG. 24 is a flowchart of processing executed by an FP2 according to the embodiment of this invention.

FIG. 24 is a flowchart of processing executed by the FP2 (213) according to the embodiment of this invention.

Upon start of the processing, the FP2 (213) acquires the failure information of the own node 110 (Step 2401).

Next, the FP2 (213) acquires the load information of the own node 110 (Step 2402).

Then, the FP2 (213) transmits a failure monitor request to the FP1 (212) operated in the other node 110 (Step 2403). The FP1 (212) judges in Step 2304 of FIG. 23 whether the failure monitor request has been received.

Subsequently, the FP2 (213) transmits a load information acquisition request to the FP3 (214) operated in the other node 110 (2404). Processing executed by the FP3 (214) that has received the load information acquisition request will be described later with reference to FIG. 27.

Next, the FP2 (213) executes failure monitor processing (Step 2405). The failure monitor processing will be described later with reference to FIG. 25.

Then, the FP2 (213) executes load information collection processing (Step 2406). The load information collection processing will be described later with reference to FIG. 26.

Figure 26:
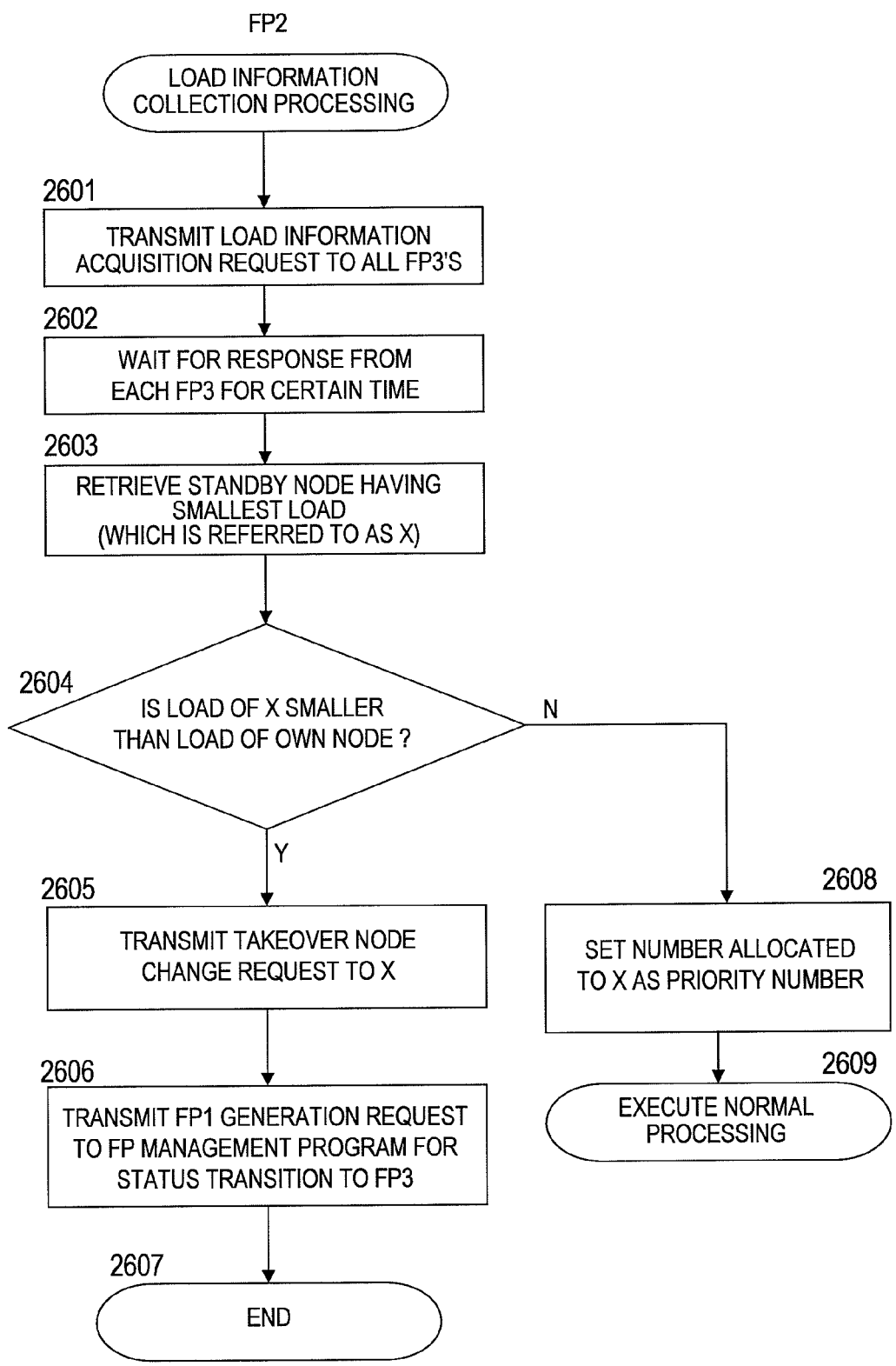
FIG. 26 is a flowchart of a load information collection processing executed by the FP2 according to the embodiment of this invention.

After that, the process returns to Step 2401, and the process of Step 2401 and processes following Step 2401 are repeated. It should be noted that when the process of Step 2404 is executed thereafter, the load information acquisition request includes a priority number determined based on a response to the last load information acquisition request, the process of which is shown in FIG. 26. In addition, when the service change information is acquired through the failure monitor processing to be described later, the obtained service change information is incorporated into the failure monitor request transmitted in Step 2403.

Figure 25:
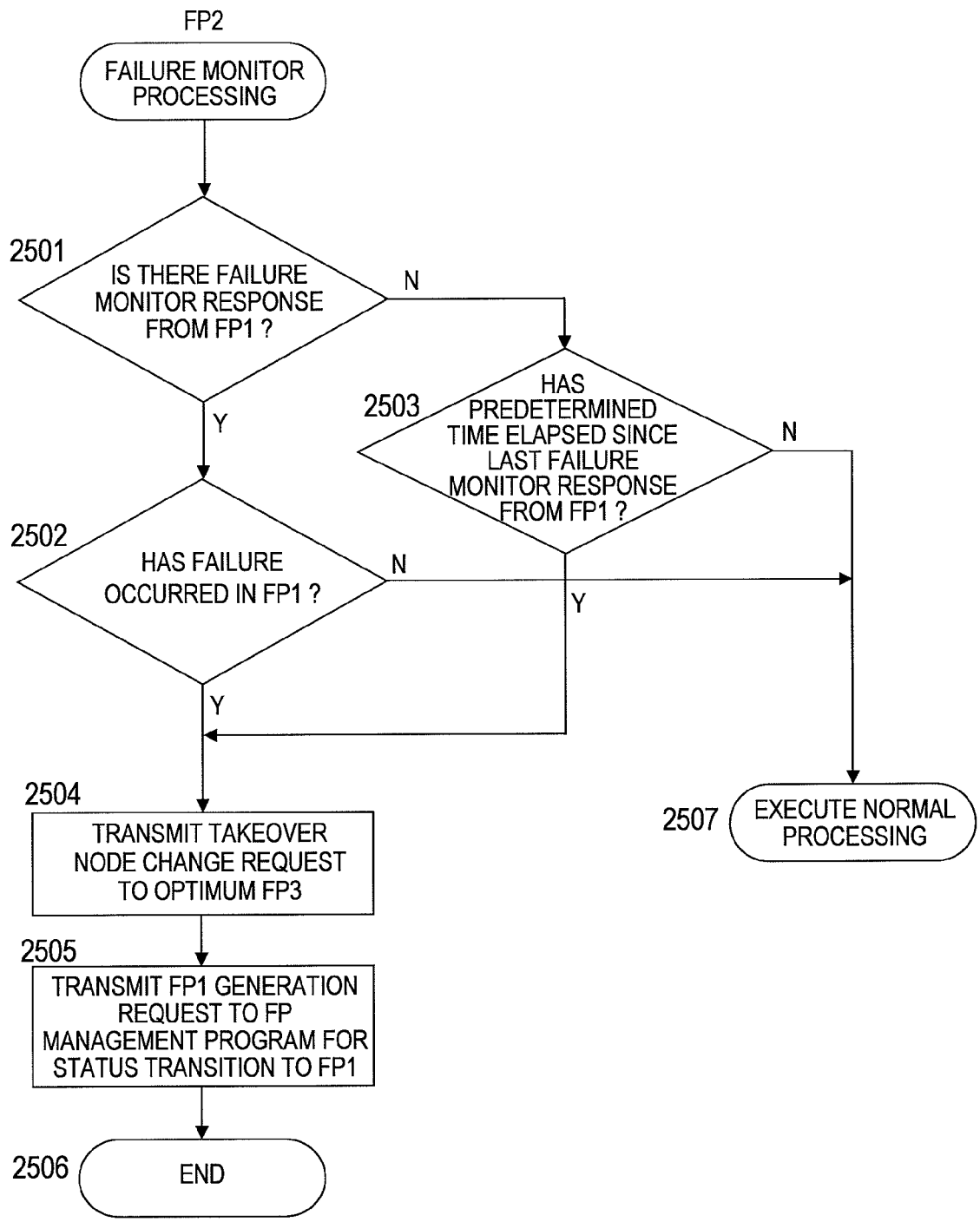
FIG. 25 is a flowchart of a failure monitor processing executed by the FP2 according to the embodiment of this invention.

FIG. 25 is a flowchart of the failure monitor processing executed by the FP2 (213) according to the embodiment of this invention.

The processing shown in FIG. 25 is executed in Step 2405 of FIG. 24.

First, the FP2 (213) judges whether a response to the failure monitor request transmitted in Step 2403 has been received (Step 2501).

When it is judged in Step 2501 that a response has not been received, the FP2 (213) judges whether a response to the failure monitor request has been received at a predetermined timing. In the example of FIG. 25, the FP2 (213) judges whether a predetermined time has elapsed since the last reception of a response to the failure monitor request from the FP1 (212) (Step 2503). Alternatively, the FP2 (213) may judge whether a predetermined time has elapsed since transmission of the failure monitor request.

When it is judged in Step 2503 that a predetermined time has not elapsed, it is impossible to judge whether a failure has occurred in the node 110 in which the FP1 (212) is operated. Thus, the FP2 (213) returns to the normal processing (Step 2507). In other words, the FP2 (213) returns to Step 2405 of FIG. 24 and executes the processes after Step 2405.

On the other hand, when it is judged in Step 2503 that a predetermined time has elapsed, it is judged that a failure has occurred in the node 110 in which the FP1 (212) is operated. In this case, the process advances to Step 2504.

When it is judged in Step 2501 that a response has been received, the FP2 (213) refers to a content of the response and judges whether a failure has occurred in the node 110 that has transmitted the response (Step 2502). For example, when the response contains information indicating that a failure has occurred in the node 110, the FP2 (213) judges that a failure has occurred in the node 110 that has transmitted the response.

When it is judged in Step 2502 that a failure has not occurred in the node 110, the FP2 (213) returns to the normal processing (Step 2507).

On the other hand, when it is judged in Step 2502 that a failure has occurred in the node 110, the FP2 (213) transmits a takeover node change request to the FP3 (214) operated in the node 110 most suited for the takeover node (Step 2504). The node most suited for the takeover node is, for example, a node 110 having the smallest load among the nodes 110 in which the FP3's (214) are operated.

Subsequently, for transition to the FP1 (212), the FP2 (213) transmits an FP1 (212) generation request to the FP management program 211 (Step 2505).

Upon ending the process of Step 2505, the processing of the FP2 (213) is ended (2506).

FIG. 26 is a flowchart of the load information collection processing executed by the FP2 (213) according to the embodiment of this invention.

First, the FP2 (213) transmits a load information acquisition request to all the FP3's (214) operated in the other nodes 110 (Step 2601).

Next, the FP2 (213) waits for a response to the load information acquisition request from the FP3's (214) for a predetermined time (Step 2602).

Then, the FP2 (213) refers to the response received from the FP3's (214) and retrieves a standby node having the smallest load. The standby node retrieved as a result of the retrieval will hereinafter be referred to as "X".

Subsequently, the FP2 (213) judges whether the load of the X is smaller than the load of the own node 110 (Step 2604). When it is judged that the load of the X is smaller than the load of the own node 110, the X is more suited for the takeover node than the own node 110. In this case, the process advances to Step 2605. On the other hand, when it is judged that the load of the X is not smaller than the load of the own node 110, the process advances to Step 2608.

It should be noted that in Step 2604, the number of users who access each of the nodes 110 may be compared with one another as the load. For example, when the number of users who access the X is smaller than the number of users who access the own node 110, it is judged that the X is more suited for the takeover node than the own node 110. Alternatively, the number of file systems managed by each of the nodes 110 may be compared with one another as the load. For example, when the number of file systems managed by the X is smaller than the number of file systems managed by the own node 110, it is judged that the X is more suited for the takeover node than the own node 110.

Alternatively, increase ratios of loads of the nodes 110 may be compared with one another instead of the current loads. For example, when the load increase ratio of the X is smaller than the load increase ratio of the own node 110, it is judged that the X is more suited for the takeover node than the own node 110. Alternatively, values of loads after an elapse of a predetermined time may be predicted based on the load increase ratios of the nodes 110, and the predicted values of the loads may be compared with one another.

In Step 2608, the FP2 (213) sets a number allocated to the X (e.g., identifier of the X) as the priority number. The priority number is transmitted to all the standby nodes the next time the process of Step 2404 is executed.

Next, the FP2 (213) returns to the normal processing (Step 2609). In other words, the FP2 (213) returns to Step 2406 of FIG. 24 and executes the processes after Step 2406.

In Step 2605, the FP2 (213) transmits a takeover node change request to the FP3 (214) operated in the X. The takeover node change request contains service information necessary for taking over the service. The service information is retained by the FP3 (214) as the takeover information 2009.

Next, for transition to the FP3 (214), the FP2 (213) transmits an FP3 (214) generation request to the FP management program 211 (Step 2606).

Upon ending the process of Step 2606, the processing of the FP2 (213) is ended (2607).

Figure 27:
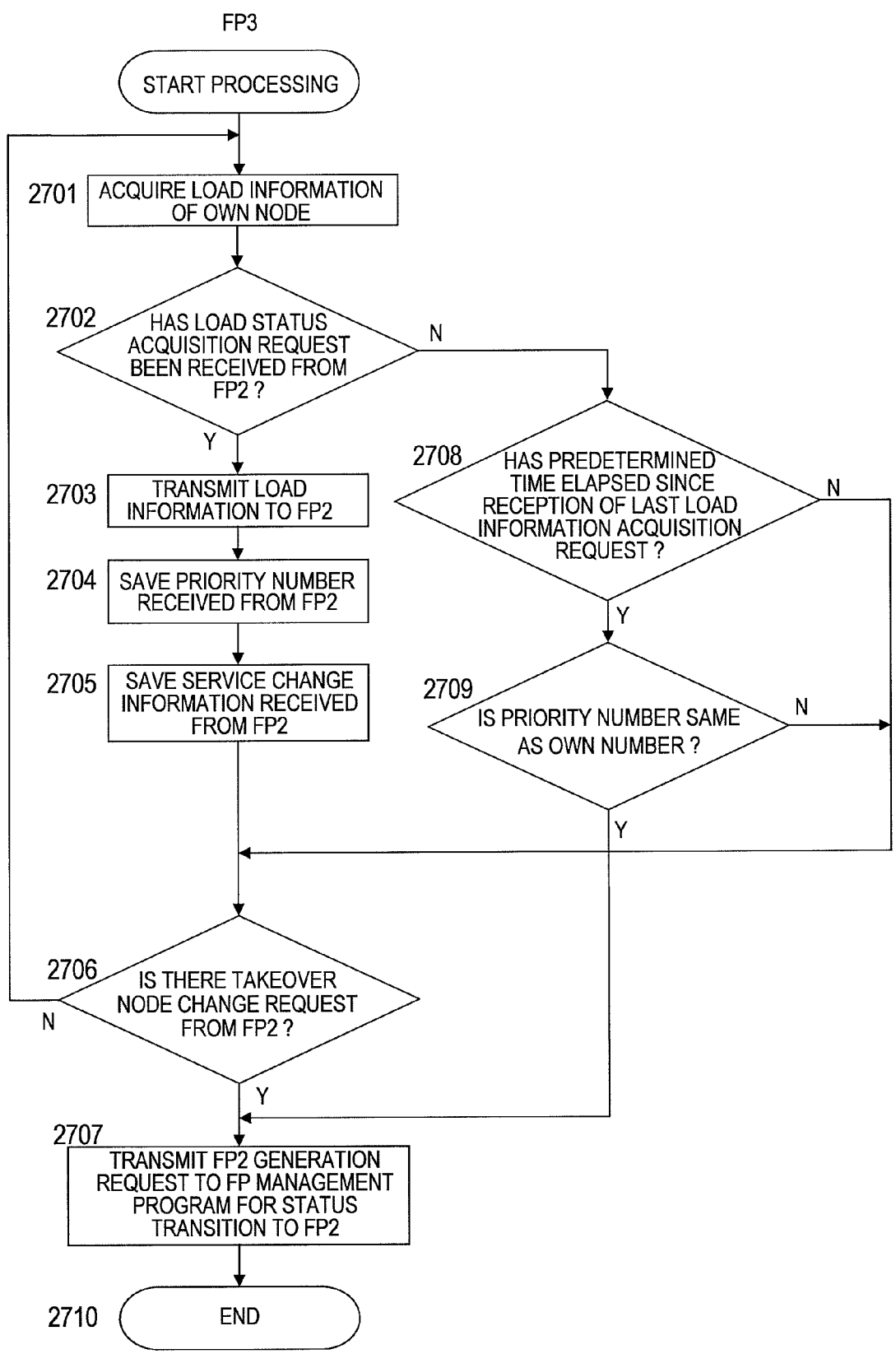
FIG. 27 is a flowchart of processing executed by an FP3 according to the embodiment of this invention.

FIG. 27 is a flowchart of processing executed by the FP3 (214) according to the embodiment of this invention.

Upon start of the processing, the FP3 (214) acquires load information of the own node 110 (Step 2701).

Next, the FP3 (214) judges whether a load information acquisition request has been received from the FP2 (213) (Step 2702).

When it is judged in Step 2702 that a load information acquisition request has been received, the FP3 (214) responds to the received request (Step 2703). Specifically, the FP3 (214) transmits, to the transmission source of the load information acquisition request, the load information of the own node 110 acquired in Step 2701.

Then, the FP3 (214) saves the priority number contained in the received load information acquisition request (Step 2704). Specifically, the FP3 (214) saves the priority number contained in the received load information acquisition request as the priority number 2008 of the control information 215.

Subsequently, the FP3 (214) saves the service change information contained in the received load information acquisition request (Step 2705). Specifically, the FP3 (214) reflects the service change information contained in the received load information acquisition request on the takeover information 2009 of the control information 215.

Next, the FP3 (214) judges whether a takeover node change request has been received from the FP2 (213) (Step 2706).

When it is judged in Step 2706 that the takeover node change request has not been received, the process returns to Step 2701.

On the other hand, when it is judged in Step 2706 that the takeover node change request has been received, the FP3 (214) transmits an FP2 (213) generation request to the FP management program 211 for transition to the FP2 (213) (Step 2707).

When it is judged in Step 2702 that the load information acquisition request has not been received, the FP3 (214) judges whether a predetermined time has elapsed since the last load information acquisition request has been received (Step 2708).

When it is judged in Step 2708 that a predetermined time has not elapsed, it is impossible to judge whether a failure has occurred in the node 110 in which the FP2 (213) is operated. In this case, the process advances to Step 2706.

On the other hand, when it is judged in Step 2708 that a predetermined time has elapsed, it is judged that a failure has occurred in the node 110 in which the FP2 (213) is operated.

In this case, the FP3 (214) judges whether the priority number retained in the FP3 (214) is the same as the number allocated to the own node 110 (e.g., identifier of the own node 110) (Step 2709).

When it is judged in Step 2709 that the priority number is not the same as the number allocated to the own node 110, the own node 110 is not the standby node most suited for the takeover node. In this case, the process advances to Step 2706.

On the other hand, when it is judged in Step 2709 that the priority number is the same as the number allocated to the own node 110, the own node 110 is the standby node that is most suited for the takeover node. In this case, for transition to the FP2 (213), the process advances to Step 2707.

Upon ending the process of Step 2707, the processing of the FP3 (214) is ended (2710).

Figure 28:
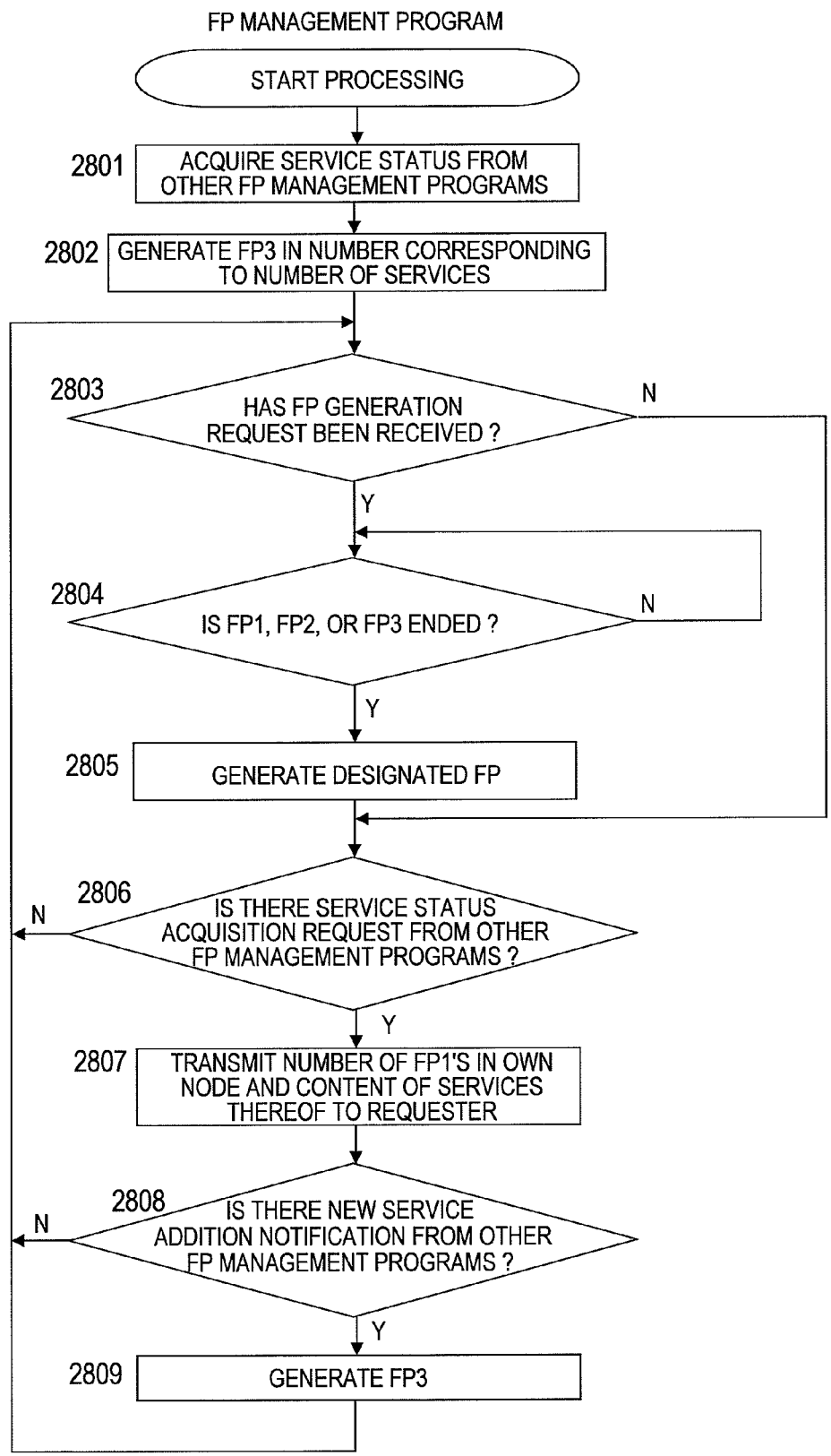
FIG. 28 is a flowchart of processing executed by an FP management program according to the embodiment of this invention.

FIG. 28 is a flowchart of processing executed by the FP management program 211 according to the embodiment of this invention.

As already described, the status transitions of the failover program 210 are realized through the deletion and generation of the FP1 (212), the FP2 (213), and the FP3 (214). For example, when the FP2 (213) transits to the FP3 (214), the FP2 (213) is ended and an FP3 (214) is generated thereafter as a new process. The FP management program 211 is a special program for managing such status transitions of the failover program 210.

Specifically, upon detection of an end of the failover program 210 of each rank, the FP management program 211 generates a failover program 210 of a designated rank (i.e., FP1 (212), FP2 (213), or FP3 (214)) as a new process. The rank to be generated (i.e., rank after status transition) is designated in advance by the failover program 210 of an ending rank (i.e., failover program 210 before status transition). When the rank to be generated is not designated in advance (e.g., when the failover program 210 is ended due to an occurrence of a failure), the FP management program 211 generates an FP3 (214) after the process before the status transition is ended.

Further, at a time of activation, the FP management program 211 transmits a service status acquisition request to the FP management program 211 operated in the other nodes 110. The FP management program 211 that has received the service status acquisition request transmits the number of FP1's (212) operated in the own node 110 and service information regarding the service provided by the FP1's (212) as a response. Based on the response, the activated FP management program 211 can grasp the number of services that are provided in the computer system. Then, the activated FP management program 211 generates an FP3 (214) in a number corresponding to the number of provided services.

The FP management program 211 that has received the request to generate a new service from the user generates an FP2 (213). In addition, the FP management program 211 notifies the FP management program 211 of the other nodes 110 of the new service generation. The FP management program 211 that has received the notification newly generates an FP3 (214).

Hereinafter, specific processing of the FP management program 211 will be described.

First, the FP management program 211 acquires the number of provided services and service information from the FP management program 211 of the other nodes 110 (Step 2801).

Next, the FP management program 211 generates an FP3 (214) in a number same as the number of provided services (Step 2802).

Then, the FP management program 211 judges whether an FP generation request has been received (Step 2803). The FP generation request is a request transmitted in Step 2505 of FIG. 25, Step 2606 of FIG. 26, or Step 2707 of FIG. 27.

When it is judged in Step 2803 that the FP generation request has not been received, the process advances to Step 2806.

On the other hand, when it is judged in Step 2803 that the FP generation request has been received, the FP management program 211 judges whether a process before status transition, that is, the FP1 (212), the FP2 (213), or the FP3 (214) has ended (Step 2804).

When it is judged in Step 2804 that the process before status transition has not ended, the process returns to Step 2804 to wait for the end of the process.

On the other hand, when it is judged in Step 2804 that the process before status transition has ended, the FP management program 211 generates a process designated by the FP generation request (Step 2805).

Subsequently, the FP management program 211 judges whether a service status acquisition request has been received from the FP management program 211 of the other node 110 (Step 2806). The service status acquisition request in this case has been transmitted in Step 2801 by the FP management program 211 of the other node 110.

When it is judged in Step 2806 that the service status acquisition request has not been received, the process returns to Step 2803.

On the other hand, when it is judged in Step 2806 that the service status acquisition request has been received, the FP management program 211 transmits to the transmission source of the request the number of FP1's (212) operated in the own node 110 and the service information regarding the services provided by those FP1's (212) (Step 2807).

Next, the FP management program 211 judges whether a new service addition notification has been received from the FP management program 211 of the other node 110 (Step 2808).

When it is judged in Step 2808 that the new service addition notification has not been received, the process returns to Step 2803.

On the other hand, when it is judged in Step 2808 that the new service addition notification has been received, the FP management program 211 generates an FP3 (214) (Step 2809) and returns to Step 2803.

As described above, according to the embodiment of this invention, the takeover node for taking over the service provision when a failure occurs in the node providing the service is selected in advance. Thus, a ready takeover at the time of failure occurrence can be realized. In addition, when loads of the nodes fluctuate before an occurrence of a failure, the takeover node is changed so that the node having the smallest load at that point of time is set as the takeover node. Accordingly, a stable operation due to load balance can be realized. The processing described above is executed automatically by the nodes 110. Therefore, operation management costs can be reduced.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   a plurality of computers including a first computer, a second computer, and a third computer; and a storage device coupled to the plurality of computers via a network,
  the first computer including a first interface coupled to the network, a first processor coupled to the first interface, and a first memory coupled to the first processor,
  the second computer including a second interface coupled to the network, a second processor coupled to the second interface, and a second memory coupled to the second processor,
  the third computer including a third interface coupled to the network, a third processor coupled to the third interface, and a third memory coupled to the third processor, wherein:
the first computer is configured to:
  execute, upon reception of an access request to a storage area of the storage device from a client computer coupled to the plurality of computers, the requested access; and
  transmit to the client computer a response to the access request;
the second computer is configured to:
  judge whether a failure has occurred in the first computer;
  obtain load information of the second computer;
  obtain load information of the third computer from the third computer; and
  transmit a change request to the third computer when the obtained load information satisfies a predetermined condition; and
the third computer is configured to judge whether a failure has occurred in the first computer when the change request is received from the second computer,
wherein the third computer is further configured to:
  judge whether a failure has occurred in the second computer; and
  judge whether a failure has occurred in the first computer when it is judged that a failure has occurred in the second computer.

2. The computer system according to claim 1, wherein the second computer is further configured to:
  transmit the change request to the third computer when a failure occurs in the first computer;
  execute, upon reception of an access request to the storage area of the storage device from the client computer, the requested access; and
  transmit to the client computer a response to the access request.

3. The computer system according to claim 2, wherein the second computer is further configured to set to the second computer, when it is judged that a failure has occurred in the first computer, an address that is the same as an address set to the first computer as a destination of the access request from the client computer.

4. The computer system according to claim 1, wherein the second computer is further configured to compare the load information of the third computer with the load information of the second computer, and judge that the obtained load information satisfies the predetermined condition when a load of the third computer is smaller than a load of the second computer.

5. The computer system according to claim 4, wherein:
the plurality of computers further include a fourth computer,
  the fourth computer including a fourth interface coupled to the network, a fourth processor coupled to the fourth interface, and a fourth memory coupled to the fourth processor;
the second computer is further configured to:
  obtain load information of the fourth computer from the fourth computer;
  compare the load information of the fourth computer with the load information of the third computer; and
  transmit the change request to the third computer when it is judged that the load of the third computer is smaller than a load of the fourth computer and the load of the third computer is smaller than the load of the second computer; and
the fourth computer is configured to judge whether a failure has occurred in the first computer upon reception of the change request from the second computer.

6. The computer system according to claim 5, wherein:
the second computer is further configured to transmit, when it is judged that the load of the third computer is smaller than the load of the fourth computer, priority information containing information for identifying the third computer to the third computer and the fourth computer; and
the third computer is further configured to:
  judge whether a failure has occurred in the second computer; and
  judge whether a failure has occurred in the first computer when it is judged that a failure has occurred in the second computer and the last priority information received from the second computer contains them information for identifying the third computer.

7. The computer system according to claim 6, wherein;
the first computer is further configured to transmit a predetermined signal at a predetermined timing;
the second computer is further configured to:
  judge that a failure has occurred in the first computer when the predetermined signal cannot be received at the predetermined timing; and
  obtain the load information of the third computer and the load information of the fourth computer by transmitting a load information acquisition request to the third computer and the fourth computer at a predetermined timing and receiving a response containing the load information from the third computer and the fourth computer; and
the third computer is further configured to judge that a failure has occurred in the second computer when the load information acquisition request cannot be received at the predetermined timing.

8. The computer system according to claim 1, further comprising, as one of the plurality of computers, a fourth computer including a fourth interface coupled to the network, a fourth processor coupled to the fourth interface, and a fourth memory coupled to the fourth processor,
wherein the fourth computer is configured to:
  transmit load information of the fourth computer to the second computer; and
  judge, upon reception of the change request from the second computer, whether a failure has occurred in the first computer.

9. The computer system according to claim 1, wherein:
the first computer provides a first service that is provided by responding to the access request made with respect to a first storage area of the storage device by a first user;
the second computer is further configured to:
  transmit a first failure monitor request to the first computer providing the first service; and judge that a failure has occurred in the first computer when a response to the first failure monitor request cannot be received from the first computer at a predetermined timing; and when one of the plurality of computers receives an instruction to provide a second service that is provided by responding to the access request made with respect to a second storage area of the storage device by a second user, the one of the plurality of computers that has received the instruction is configured to:

transmit a second failure monitor request to at least one of the plurality of computers providing the second service;

obtain load information of at least one computer among the plurality of computers;

transmit, when a response to the second failure monitor request cannot be received at a predetermined timing, the change request to a computer having the smallest load among the at least one computer; and provide the second service.

10. The computer system according to claim 1, wherein:

the load information of each of the plurality of computers contains a value indicating a load of each of the plurality of computers; and the value indicating the load of each of the plurality of computers includes at least one of a usage ratio of the processor included in each of the plurality of computers, a usage ratio of the memory included in each of the plurality of computers, a usage ratio of the network used by each of the plurality of computers, the number of times each of the plurality of computers accesses the storage device, and the number of processes operated in each of the plurality of computers.

11. A control method in a computer system including:

a plurality of computers including a first computer, a second computer, and a third computer; and a storage device coupled to the plurality of computers via a network, the first computer including a first interface coupled to the network, a first processor coupled to the first interface, and a first memory coupled to the first processor, the second computer including a second interface coupled to the network, a second processor coupled to the second interface, and a second memory coupled to the second processor, the third computer including a third interface coupled to the network, a third processor coupled to the third interface, and a third memory coupled to the third processor, the method comprising the steps of:

executing, by the first computer, upon reception of an access request to a storage area of the storage device from a client computer coupled to the plurality of computers, the requested access;

transmitting, by the first computer, a response to the access request to the client computer;

judging, by the second computer, whether a failure has occurred in the first computer;

obtaining, by the second computer, load information of the second computer;

obtaining, by the second computer, load information of the third computer from the third computer;

judging, by the second computer, whether the obtained load information satisfies a predetermined condition;

transmitting, by the second computer, a change request to the third computer when the obtained load information satisfies the predetermined condition; and judging, by the third computer, whether a failure has occurred in the first computer when the change request is received from the second computer, further comprising the steps of:

judging, by the third computer, whether a failure has occurred in the second computer; and judging, by the third computer, when it is judge that a failure has occurred in the second computer, whether a failed has occurred in the first computer.

12. The method according to claim 11, further comprising the steps of:

transmitting, by the second computer, the change request to the third computer when a failure occurs in the first computer;

setting, by the second computer, to the second computer, when a failure occurs in the first computer, an address that is the same as an address set to the first computer as a destination of the access request from the client computer;

executing, by the second computer, upon reception of an access request with the address set to the second computer as the destination, the requested access; and transmitting, by the second computer, a response to the access request to the client computer.

13. The method according to claim 11, wherein the step of judging, by the second computer, whether the obtained load information satisfies the predetermined condition includes comparing the load information of the third computer and the load information of the second computer and judging that the obtained load information satisfies the predetermined condition when it is judged that a load of the third computer is smaller than a load of the second computer.

14. The method according to claim 13, wherein:

the plurality of computers further include a fourth computer, the fourth computer including a fourth interface coupled to the network, a fourth processor coupled to the fourth interface, and a fourth memory coupled to the fourth processor;

the method further comprises the steps of:

obtaining, by the second computer, load information of the fourth computer from the fourth computer; and comparing, by the second computer, the load information of the fourth computer with the load information of the third computer; and the step of transmitting, by the second computer, the change request to the third computer is executed when it is judged that the load of the third computer is smaller than a load of the fourth computer and the load of the third computer is smaller than the load of the second computer.

15. The method according to claim 14, further comprising the steps of:

transmitting, by the second computer, when it is judged that the load of the third computer is smaller than the load of the fourth computer, priority information containing information for identifying the third computer to the third computer and the fourth computer;

judging, by the third computer, whether a failure has occurred in the second computer; and judging, by the third computer, whether a failure has occurred in the first computer when it is judged that a failure has occurred in the second computer and the last priority information received from the second computer contains the information for identifying the third computer.

16. The method according to claim 11, further comprising the step of, when the computer system further includes as one of the plurality of computers a fourth computer having a fourth interface coupled to the network, a fourth processor coupled to the fourth interface, and a fourth memory coupled to the fourth processor, transmitting, by the fourth computer, load information of the fourth computer to the second computer.

17. The method according to claim 11, wherein:
the first computer provides a first service that is provided by responding to the access request made with respect to a first storage area of the storage device by a first user; and
the method further comprises the steps of:
transmitting, by the second computer, a first failure monitor request to the first computer providing the first service;
judging, by the second computer, that a failure has occurred in the first computer when the second computer cannot receive a response to the first failure monitor request from the first computer at a predetermined timing;
transmitting, when one of the plurality of computers receives an instruction to provide a second service that is provided by responding to the access request made with respect to a second storage area of the storage device by a second user, by the one of the plurality of computers that has received the instruction, a second failure monitor request to at least one of the plurality of computers providing the second service;
obtaining, by the one of the plurality of computers that has received the instruction, load information of at least one computer among the plurality of computers;
transmitting, by the one of the plurality of computers that has received the instruction, when the one of the plurality of computers that has received the instruction cannot receive a response to the second failure monitor request at a predetermined timing, the change request to a computer having the smallest load among the at least one computer; and
providing, by the one of the plurality of computers that has received the instruction, the second service.

18. A computer system, comprising:
a plurality of computers including a first computer, a second computer, a third computer, and a fourth computer; and
a storage device coupled to the plurality of computers via a network,
the first computer including a first interface coupled to the network, a first processor coupled to the first interface, and a first memory coupled to the first processor,
the second computer including a second interface coupled to the network, a second processor coupled to the second interface, and a second memory coupled to the second processor,
the third computer including a third interface coupled to the network, a third processor coupled to the third interface, and a third memory coupled to the third processor,
the fourth computer including a fourth interface coupled to the network, a fourth processor coupled to the fourth interface, and a fourth memory coupled to the fourth processor, wherein:
the first computer is configured to:
provide a first service of executing, upon reception of an access request to a storage area of the storage device from a first user of a client computer coupled to the plurality of computers, the requested access, and transmitting to the client computer a response to the access request; and
transmit, upon reception of a first failure monitor request to the first computer providing the first service from the second computer, a response to the first failure monitor request to the second computer;
the second computer is configured to:
judge that a failure has occurred in the first computer when the response to the first failure monitor request cannot be received at a predetermined timing;
obtain load information of the second computer;
obtain load information of the third computer and load information of the fourth computer by transmitting a load information acquisition request to the third computer and the fourth computer at a predetermined timing and receiving a response containing the load information from the third computer and the fourth computer;
compare the load information of the fourth computer with the load information of the third computer;
compare the load information of the third computer with the load information of the second computer when it is judged that a load of the third computer is smaller than a load of the fourth computer;
transmit a change request to the third computer when it is judged that the load of the third computer is smaller than a load of the second computer;
transmit, when it is judged that the load of the third computer is smaller than the load of the fourth computer, priority information containing information for identifying the third computer to the third computer and the fourth computer;
set, when it is judged that a failure has occurred in the first computer, an address same as an address set as a destination of the access request from the client computer to the second computer;
execute, upon reception of an access request with the set address as the destination, the requested access; and
transmit a response to the access request to the client computer;
the third computer is configured to:
transmit the load information of the third computer to the second computer;
judge whether a failure has occurred in the first computer when the change request is received from the second computer;
judge that a failure has occurred in the second computer when the load information acquisition request cannot be received at the predetermined timing; and
judge whether a failure has occurred in the first computer when it is judged that a failure has occurred in the second computer and the last priority information received from the second computer contains the information for identifying the third computer;
the fourth computer is configured to:
transmit the load information of the fourth computer to the second computer; and
judge whether a failure has occurred in the first computer when the change request is received from the second computer;
when the computer system further includes as one of the plurality of computers a fifth computer having a fifth interface coupled to the network, a fifth processor coupled to the fifth interface, and a fifth memory coupled to the fifth processor, the fifth computer is configured to:

transmit load information of the fifth computer to the second computer; and judge whether a failure has occurred in the first computer when the change request is received from the second computer;

when one of the plurality of computers receives an instruction to provide a second service that is provided by responding to the access request made with respect to a second storage area of the storage device by a second user, the one of the plurality of computers that has received the instruction is configured to:

transmit a second failure monitor request to at least one of the plurality of computers providing the second service;

obtain load information of at least one computer among the plurality of computers;

transmit, when a response to the second failure monitor request cannot be received at a predetermined timing, the change request to a computer having the smallest load among the at least one computer; and provide the second service;

the load information of each of the plurality of computers contains a value indicating a degree of load of each of the plurality of computers; and the value indicating the degree of load of each of the plurality of computers includes at least one of a usage ratio of the processor included in each of the plurality of computers, a usage ratio of the memory included in each of the plurality of computers, a usage ratio of the network used by each of the plurality of computers, the number of times each of the plurality of computers accesses the storage device, and the number of processes operated in each of the plurality of computers.

* * * * *